(12) United States Patent
Chiarizio et al.

(10) Patent No.: US 10,470,127 B2
(45) Date of Patent: Nov. 5, 2019

(54) MASTER SLAVE WIRELESS FIRE ALARM AND MASS NOTIFICATION SYSTEM

(71) Applicant: Tyco Fire & Security GmbH, Neuhausen am Rheinfall (CH)

(72) Inventors: Martin A. Chiarizio, Coral Springs, FL (US); Robert Feltham, Fort Lauderdale, FL (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 0 days.

(21) Appl. No.: 15/845,035

(22) Filed: Dec. 18, 2017

(65) Prior Publication Data

US 2018/0108247 A1    Apr. 19, 2018

Related U.S. Application Data

(62) Division of application No. 14/846,377, filed on Sep. 4, 2015, now Pat. No. 9,875,644.

(Continued)

(51) Int. Cl.
*H04W 52/02*    (2009.01)
*G08B 25/10*    (2006.01)
(Continued)

(52) U.S. Cl.
CPC ........ *H04W 52/0238* (2013.01); *G08B 17/00* (2013.01); *G08B 17/10* (2013.01);
(Continued)

(58) Field of Classification Search
CPC ...... G08B 25/10; G08B 17/00; G08B 25/009; G08B 27/008; H04B 1/713
(Continued)

(56) References Cited

U.S. PATENT DOCUMENTS 3,889,170 A    6/1975  Sarbacher et al.
4,426,612 A    1/1984  Wicnienski et al.
(Continued)

FOREIGN PATENT DOCUMENTS

EP    1119837 B1    2/2004
EP    1501060 A1    1/2005
(Continued)

OTHER PUBLICATIONS

EP 15184521.1 - 1810, Extended European Search Report, dated Feb. 3, 2016. Nine pages.

(Continued)

*Primary Examiner* — Kerri L McNally
(74) *Attorney, Agent, or Firm* — HoustonHogle LLP

(57) ABSTRACT

A wireless fire alarm notification system uses wireless repeater devices to annunciate an alarm to slave devices from the control panel. A notification device provides a local synchronization signal via wire to a secondary notification device. A method enables the activation or deactivation of child device without the child device having to query their parent repeater. A circuit to test the integrity of an active battery charger, a battery, and an isolation circuit is also shown. A method for qualifying that an RF signal meets a specified minimum acceptable level is described. A method for wirelessly sending events to avoid RF link overload is provided. A programming checksum method confirms that an annunciator has latest programming information. A method to automatically process messages from new devices without having to hardcode repeaters to support these new devices is also described.

22 Claims, 12 Drawing Sheets

Related U.S. Application Data

(60) Provisional application No. 62/047,982, filed on Sep. 9, 2014, provisional application No. 62/060,845, filed on Oct. 7, 2014.

(51) Int. Cl.

| | | |
|---|---|---|
| *G08B 17/00* | (2006.01) | |
| *H04B 1/713* | (2011.01) | |
| *G08B 27/00* | (2006.01) | |
| *G08B 25/00* | (2006.01) | |
| *H04W 4/90* | (2018.01) | |
| *G08B 17/10* | (2006.01) | |
| *H04W 56/00* | (2009.01) | |

(52) U.S. Cl.
CPC ......... *G08B 25/007* (2013.01); *G08B 25/009* (2013.01); *G08B 25/10* (2013.01); *G08B 27/00* (2013.01); *G08B 27/008* (2013.01); *H04B 1/713* (2013.01); *H04W 4/90* (2018.02); *H04W 52/0216* (2013.01); *H04W 56/0055* (2013.01); *Y02D 70/1222* (2018.01); *Y02D 70/142* (2018.01); *Y02D 70/144* (2018.01); *Y02D 70/166* (2018.01); *Y02D 70/22* (2018.01)

(58) Field of Classification Search
USPC .................................................... 340/539.17
See application file for complete search history.

(56) References Cited

U.S. PATENT DOCUMENTS

| | | | |
|---|---|---|---|
| 4,531,114 A | 7/1985 | Topol et al. | |
| 4,947,124 A | 8/1990 | Hauser | |
| 4,952,913 A | 8/1990 | Pauley et al. | |
| 4,956,597 A | 9/1990 | Heavey et al. | |
| 5,528,149 A | 6/1996 | Chen | |
| 5,726,573 A | 5/1998 | Chen et al. | |
| 5,969,436 A | 10/1999 | Chalasani et al. | |
| 6,078,269 A | 6/2000 | Markwell et al. | |
| 6,278,279 B1 | 8/2001 | Daun-Lindbert et al. | |
| 6,472,980 B1 | 10/2002 | Jen et al. | |
| 6,501,942 B1 | 12/2002 | Weissman et al. | |
| RE38,183 E | 7/2003 | Kosich et al. | |
| 6,914,533 B2 | 7/2005 | Petite | |
| 7,382,243 B1 * | 6/2008 | Shepher | G08B 25/009 235/384 |
| 7,714,734 B1 | 5/2010 | Billman | |
| 7,817,031 B2 | 10/2010 | Kates | |
| 7,920,053 B2 | 4/2011 | Pattok et al. | |
| 7,936,264 B2 | 5/2011 | Kates | |
| 8,193,665 B2 | 6/2012 | Eiden et al. | |
| 8,194,592 B2 | 6/2012 | Kore et al. | |
| 8,269,642 B2 | 9/2012 | Morita et al. | |
| 8,392,606 B2 | 3/2013 | Banks et al. | |
| 8,456,278 B1 | 6/2013 | Bergman | |
| 8,547,107 B2 | 10/2013 | Abe et al. | |
| 9,728,074 B2 | 8/2017 | Chiarizio et al. | |
| 9,875,644 B2 | 1/2018 | Chiarizio et al. | |
| 2004/0212497 A1 | 10/2004 | Stilp | |
| 2005/0159152 A1 | 7/2005 | Tice et al. | |
| 2005/0262216 A1 | 11/2005 | Kashiwabara et al. | |
| 2006/0082461 A1 | 4/2006 | Andres et al. | |
| 2007/0252688 A1* | 11/2007 | Eisold | G08B 27/008 340/506 |
| 2007/0273511 A1 | 11/2007 | Clary | |
| 2008/0186173 A1 | 8/2008 | Gates | |
| 2009/0146801 A1 | 6/2009 | Piccolo, III | |
| 2009/0147714 A1 | 6/2009 | Jain et al. | |
| 2009/0313659 A1 | 12/2009 | Samuels | |
| 2010/0194354 A1 | 8/2010 | Gotou et al. | |
| 2010/0315089 A1 | 12/2010 | Rapich | |
| 2010/0315224 A1 | 12/2010 | Orsini et al. | |
| 2011/0184541 A1 | 7/2011 | Huang et al. | |
| 2011/0298613 A1 | 12/2011 | Ayed | |
| 2013/0024800 A1 | 1/2013 | Sundriyal et al. | |
| 2013/0120136 A1 | 5/2013 | Johnson et al. | |
| 2013/0336292 A1 | 12/2013 | Kore et al. | |
| 2014/0029604 A1 | 1/2014 | Nicholls et al. | |
| 2014/0036914 A1 | 2/2014 | Samuels | |
| 2014/0062417 A1 | 3/2014 | Li et al. | |
| 2014/0241533 A1* | 8/2014 | Gerrish | G08B 25/04 381/57 |

FOREIGN PATENT DOCUMENTS

| | | |
|---|---|---|
| EP | 1 057 318 | 11/2011 |
| EP | 2469493 A1 | 6/2012 |
| EP | 2677508 A1 | 12/2013 |
| WO | 2010097965 A1 | 9/2010 |

OTHER PUBLICATIONS

EP 15184523.7 Partial European Search Report, dated Feb. 3, 2016. Seven pages.

Extended European Search Report, dated Jun. 15, 2016, from European Application No. 15184523.7, filed on Sep. 9, 2015. Thirteen pages.

* cited by examiner

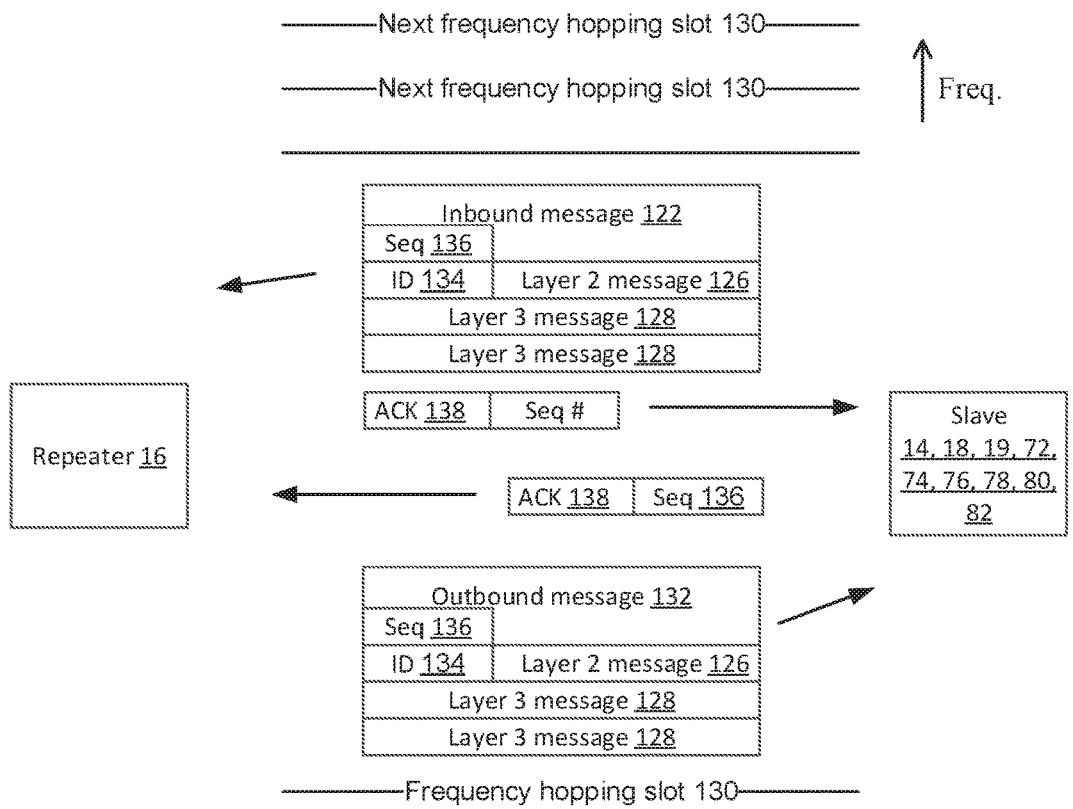
FIG. 1B
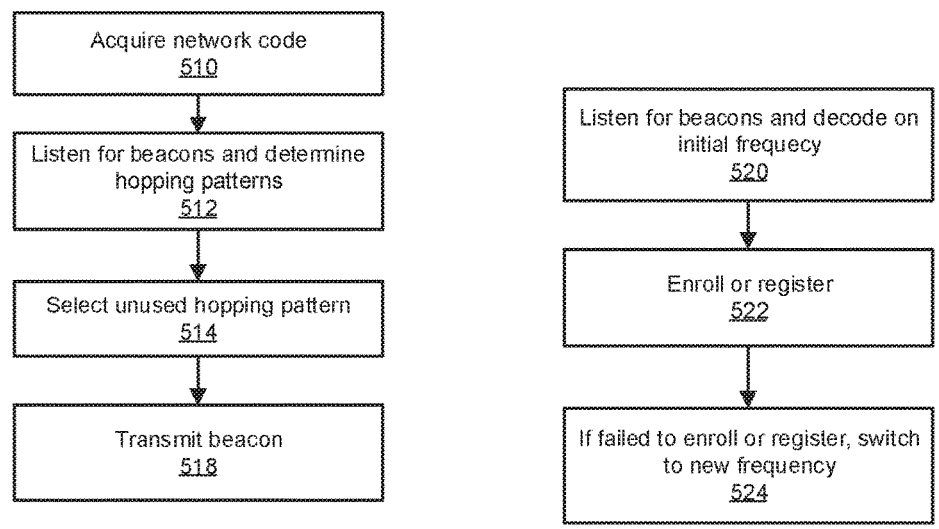
FIG. 1C
FIG. 1D

MASTER SLAVE WIRELESS FIRE ALARM AND MASS NOTIFICATION SYSTEM

RELATED APPLICATIONS

This application is a divisional of U.S. patent application Ser. No. 14/846,377 filed Sep. 4, 2015, which claims the benefit under 35 U.S.C. § 119(e) of U.S. Provisional Application Ser. No. 62/047,982, filed on Sep. 9, 2014, and U.S. provisional Application Ser. No. 62/060,845, filed on Oct. 7, 2014, which are incorporated herein by reference in their entirety.

This application is related to application Ser. No. 14/846,368, filed on Sep. 4, 2015, by the same inventors, now U.S. Pat. No. 9,728,074, and entitled MODULAR WIRELESS MASS EVACUATION NOTIFICATION SYSTEM, which application is incorporated herein by this reference.

BACKGROUND OF THE INVENTION

Fire alarm systems comprise a set of devices that function to detect and notify people when smoke and/or fire is present. Such systems typically include a control panel, initiating devices, and notification devices. The control panel functions as the hub of the system by monitoring inputs, monitoring system integrity, controlling outputs, and relaying information. Examples of initiating devices include manually actuated devices (e.g., fire alarm boxes/pull stations) as well as automatically actuated devices capable of responding to any number of physical changes associated with a fire such as smoke and heat. Notification devices primarily rely on audible alerts and visible alerts to notify occupants of the need to evacuate or take action. Recent updates to fire alarm codes and standards have led fire alarm system manufacturers to expand their systems with voice evacuation capabilities to provide mass notification capabilities including support for multiple types of messaging and prioritized messaging according to local facilities' emergency response plans.

Various types of fire alarm systems are known in the art. Traditionally, the various hardware components for such systems have been coupled to the control panel by hardwire connection (e.g., electrically conducting wires and cables). Such systems, however, are burdened by high installation, operation, and maintenance costs. As a result, advancements in the art have led to the development of wireless radio frequency (RF) fire alarm systems. In such wireless systems, each initiating device, such as a smoke and heat detector, is capable of transmitting wireless signals to the control panel, which in turn is capable of wirelessly initiating the appropriate notification appliances by transmission of an alarm signal.

SUMMARY OF THE INVENTION

The present invention relates generally to monitoring and mass notification systems, such as fire alarm systems, for use in occupied structures, and more particularly to a wireless monitoring and mass notification system.

In general, the present invention concerns wireless monitoring and/or mass notification systems incorporating numerous advances in the art of wireless fire alarm technology. Interconnected devices can communicate via wireless Frequency Hopping Spread Spectrum (FHSS) bi-directional Radio Frequency (RF) signals using a messaging protocol. The wireless monitoring and/or mass notification systems are comprised of main control panels and enrolled devices that communicate to each other via RF signals. In general, enrolled devices are remotely located RF-enabled devices, including repeaters, notification devices, annunciators, and slave devices. Examples of slave devices can include detection devices, tandem detection devices, relay units, and notification devices. The RF links are bi-directional allowing signals to be sent either inbound or outbound between devices.

In accordance with a first aspect of the present invention, a wireless notification device, e.g., mini-horn/strobe, annunciates an alarm via an integrated horn/strobe when activated via a wireless RF signal from the system control panel. The wireless notification device configured as a master provides a local synchronization signal that can be connected via synchronization wire to secondary self-powered notification devices configured as slaves. Each notification device connects via its own RF link to the system panel regardless of whether it is a slave or master. The synchronization (sync) signal is also used as a heartbeat to verify that the wire between master and slave devices is not broken (continuity) and to verify that there are not multiple masters on the same sync wires.

In accordance with a second aspect of the present invention, a method is provided to turn "on" or "off" notification device sounders, strobes, etc. without the notification device having to query its parent repeater.

In accordance with a third aspect of the present invention, a circuit is provided to implement an innovative method to test and verify the integrity of an active battery charger, the battery integrity, and the battery charger isolation circuitry, even when the battery charger circuit is operational and charging a battery. Using a combination of control signals from a microprocessor and analog/digital monitoring points the integrity of the above circuitry can be verified while operating.

In accordance with a fourth aspect of the present invention, a method is provided to qualify that an RF signal meets a specified minimum acceptable level before a wireless enabled device responds, whereby if the specified minimum acceptable level is not achieved, no response is transmitted.

In accordance with a fifth aspect of the present invention, a method for avoiding RF link overload is provided in an RF network wherein up to 2048 possible devices are enrolled, broadcasting 2048 alarm events to 8 annunciators at the same time. It is further contemplated that the present invention may be expanded to handle even a greater number of alarm events (e.g. in excess of 2048). In accordance with this aspect, events are broadcast in blocks of 16 thereby allowing the annunciators to acknowledge each block, and additional events are transmitted in blocks of 16 as needed.

In accordance with a sixth aspect of the present invention, whenever a new device is added to the system the programming checksum is changed. The new checksum and system time is broadcast to the system annunciators. The broadcast checksum is compared in each annunciator, and if it does not match an error message is sent to the main panel to indicate that the annunciator has not been programmed with the new devices. The broadcasted system time is used to synchronize the annunciator clocks to the main panel.

In accordance with a seventh aspect of the present invention, a method is provided which adds protocol to automatically process messages from newly designed devices to existing network without having to hardcode repeaters to support these newly designed devices. Newly designed devices need only be added to the main panel software as the repeater network will automatically handle the different types of messages from devices based on the serial number prefix which groups types of devices and their corresponding message formats automatically.

In general, according to one aspect, the invention features a wireless fire alarm notification system having a control panel for broadcasting alarm messages via wireless links. The wireless fire alarm notification system includes a wireless repeater device having a slave transceiver that receives the alarm messages from the control panel via the wireless links. The wireless repeater device has a master transceiver for wirelessly broadcasting the alarm messages to slave devices.

Typically, the control panel includes a master transceiver for broadcasting the alarm messages. In an embodiment, the slave transceiver of the wireless repeater device receives the alarm messages from the control panel via another wireless repeater device. The slave devices can be selected from the group consisting of additional repeater devices, annunciators, detection devices, tandem detection devices, utility transmitters, relay units, pull stations, and/or notification devices. The notification devices are typically strobe devices, horn devices, or horn/strobe combo devices.

In embodiments, the wireless links are bi-directional wireless links for enabling alarm messages to be sent or received between devices on the same wireless link. The wireless links are preferably slots of a frequency hopping spread spectrum (FHSS). The wireless repeater device can listen for beacons and transmit beacons using an unused hopping pattern. The slave devices can attempt to enroll or register, and switch to a new frequency upon failing to enroll or register. The slave devices can seek to join a new master device after failing to receive an acknowledgement from a previous master device. The wireless repeater device can broadcast alarm signals to its slave devices upon receiving an alarm signal from one of its slave devices.

In general, according to another aspect, the invention features a notification system having a control panel that generates wireless radio frequency alarm signals. The notification system includes a master notification device for generating an alarm notification in response to the alarm signals from the control panel and generating synchronization signals. The notification system has a slave notification device for receiving the synchronization signal via a wire and generating an alarm notification in response to the alarm signals from the control panel and the synchronization signals.

The notification devices can validate the wired connection between the devices using the synchronization signal. Preferably, the master notification device generates the synchronization signal based on a synchronization signal received via a wired connection or a wireless link. The synchronization signal can be used as a drive signal to an alarm notification component.

In general, according to another aspect, the invention features a method for controlling activation and deactivation of a child device. The child device sends a registration request to a parent repeater. The parent repeater sends an assignment message to the child device in response to the registration request. The assignment message includes an identification address associated with the child device for distinguishing the child device from other child devices within a subnet of the parent repeater. The parent repeater transmits a notification activation message to the subnet of child devices. The notification activation message includes a notification state for each child device of the subnet. The child device activates or deactivates an alarm based on the notification activation message.

The notification activation message preferably includes a bitmask listing the notification state for each child device of the subnet. In one example, the child device is a tandem detector device. In another example, the child device is a strobe device, horn device, or horn/strobe combo device. The identification address can be an 8-bit local identification number. In a preferred embodiment, the parent repeater transmits a beacon message signaling the child device to wake-up from a sleep mode and listen for the notification activation message prior to the parent repeater transmitting the notification activation message.

In general, according to another aspect, the invention features a method for testing integrity of a battery charger. A processor sends an isolation control signal to an isolation circuit thereby deactivating the isolation circuit to isolate the battery charger from a battery. The processor sends a charger load control signal to a charger load control thereby activating the charger load control to apply a charger load resistance on the battery charger. The processor measures the charging voltage of the battery charger and compares the measured charging voltage to a required charging voltage. If the charging voltage is greater than the required charging voltage, the processor determines that the battery charger is acceptable. If the charging voltage is less than the required charging voltage, the processor determines that the battery charger is unacceptable.

Preferably, the processor measures the charging voltage at an analog/digital monitoring test node. In a preferred embodiment, the charger load control is a MOSFET.

In general, according to another aspect, the invention features a method for testing integrity of a battery. A processor sends an isolation control signal to an isolation circuit thereby deactivating the isolation circuit to isolate a battery charger from the battery. The processor sends a battery load control signal to a battery load control thereby activating the battery load control to apply a battery load resistance on the battery. The processor measures a battery voltage of the battery and compares the measured battery voltage to a required battery voltage. If the battery voltage is greater than the required battery voltage, the processor determines the battery as acceptable. If the battery voltage is less than the required battery voltage, the processor determines the battery as unacceptable.

Preferably, the processor measures the battery voltage at an analog/digital monitoring test node. In a preferred embodiment, the battery load control is a MOSFET.

In general, according to another aspect, the invention features a method for testing integrity of an isolation circuit between a battery and a battery charger. A processor sends an isolation control signal to the isolation circuit thereby deactivating the isolation circuit to isolate the battery charger from the battery. The processor measures a charging voltage of the battery charger prior to activation of the isolation circuit. The processor sends another isolation control signal to the isolation circuit thereby activating the isolation circuit causing application of a charger load resistance and a battery load resistance to the battery charger. The processor measures a charging voltage after activation of the isolation circuit and compares the measured charging voltage after activation to the measured charging voltage prior to activation. If the charging voltage after activation is less than the charging voltage prior to activation, the processor determines that the isolation circuit is acceptable. If the charging voltage after activation is greater than the charging voltage prior to activation, the processor determines that the isolation circuit is unacceptable.

In general, according to another aspect, the invention features a circuit for testing integrity of a battery charger, a battery, and an isolation circuit. The circuit includes a processor for generating an isolation control signal, a charger load control signal, and a battery load control signal. The circuit further includes an isolation circuit for isolating the battery charger from the battery. The isolation circuit is configured to receive the isolation control signal from the processor. The circuit has a charger load control for applying a charger load resistance on the battery charger. The charger load control is configured to receive the charger load control signal from the processor. The circuit further includes a battery load control for applying a battery load resistance on the battery. The battery load control is configured to receive the battery load control signal from the processor.

In general, according to another aspect, the invention features a method for wirelessly sending events. A control panel wirelessly broadcasts events in a message block that stores a range of different events. An annunciator receives the message block and the annunciator sends an acknowledgement to the control panel based on receipt of the message block.

The acknowledgement can be a layer 3 event notify acknowledgement. The message block can be received by system devices enrolled in the system. The control panel can wirelessly broadcast additional events in additional message blocks. Each additional message block preferably stores the range of one to sixteen events. In an example embodiment, the control panel wirelessly broadcasts alarm events in the additional message blocks to system annunciators simultaneously. The message block can be broadcasted when a system alarm or a trouble condition changes to keep the annunciator or annunciators in sync with the control panel.

In a preferred embodiment, the message block is broadcast in an event status notify message. The event status notify message can include an Alarm LED status, a Trouble LED status, a Supervisory LED status, a Signal Silence LED status, and/or a number of devices listed in an alarm state. The event status notify message can include a device table index listing any device that is in an alarm state.

In general, according to another aspect, the invention features a programming checksum method for determining that an annunciator has the same programming information as a control panel. The control panel broadcasts a programming checksum notify message, including a system programming checksum, to the annunciator. The annunciator compares the system programming checksum to a local programming checksum of the annunciator. If the system programming checksum is different from the local programming checksum, the annunciator sends an error message to the control panel. If the system programming checksum matches the local programming checksum, the annunciator sends an acknowledgment message to the control panel.

Typically, the control panel broadcasts the programming checksum when device programming information changes. The error message typically includes information on the programming mismatch. The programming checksum notify is preferably broadcasted to multiple annunciators in the form of one message. The acknowledgment message is preferably a Layer 3 programming event notify acknowledgement message. The programming checksum notify message can include a checksum of the changed programming information. In an example embodiment, the annunciator updates the local programming checksum to match the system programming checksum such that the annunciator is in sync with the control panel. The annunciator can update local programming checksum by updating local time with system time in order to synchronize an annunciator clock with a control panel clock. The annunciator can display device information and location information matching the system programming checksum of the control panel.

In general, according to another aspect, the invention features a method for processing messages from a new device of a fire alarm system. A processor encodes the new device with device ID data. The device ID data is a serial number including a prefix byte that correlates with a device type decoding rule for messaging. The processor determines the device type decoding rule for the new device based on the prefix byte of the device ID data. The processor decodes messages for the new device based on the determined device type decoding rule.

The device type decoding rule can be a legacy rule if the prefix byte is within a value range of 1 to 11, an 8 bit status rule if the prefix byte is within a value range of 12 to 95, a 16 bit status rule if the prefix byte is within a value range of 96 to 175, or a 32 bit status rule if the prefix byte is within a value range of 176 to 254. In an example embodiment, the method includes adding the new device to software of a control panel. The processor can enable a repeater network to automatically handle different types of messages from different devices based on the determination of the device type decoding rule for each device. The device ID data can be encoded with information on whether the new device is a notification device.

In general, according to another aspect, the invention features a method for qualifying that a wireless signal for a new device meets a specified minimum acceptable level. A minimum received signal strength indicator (RSSI) level is determined based on testing for a reliable wireless link. An RSSI for a new device is measured. The measured RSSI of the new device is compared against the minimum RSSI level. If the measured RSSI is greater than the minimum RSSI, the measured RSSI is qualified as acceptable. If the measured RSSI is less than the minimum RSSI, the measured RSSI is qualified as unacceptable.

The method can further include a master device acknowledging the new device by transmitting an acknowledgment response after qualifying the measured RSSI as acceptable. Preferably, measuring the RSSI for the new device includes executing a survey process. The new device can be a master device or a slave device.

In an example embodiment, qualifying the measured RSSI as acceptable or unacceptable is performed by a processor within a master device. The new device can discover the master device by listening for master beacons of the master device. The new device can join the master beacon of the master device if the processor of the master device qualifies the measured RSSI of the new device as acceptable.

Accordingly, it is an object of the present invention to provide advancements in the field of wireless fire alarm and mass notification systems as set forth above.

In accordance with these and other objects, which will become apparent hereinafter, the instant invention will now be described with particular reference to the accompanying drawings.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1B is a schematic diagram of a repeater device and a slave device utilizing frequency hopping patterns to pass messages;

FIG. 1C is a flow chart of a self-configuration process for a master device;

FIG. 1D is a flow chart of a self-configuration process for a slave device;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including, and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Furthermore, while the present invention is disclosed in reference to an embodiment capable of sending up to 2,048 alarm events, the various advancements disclosed herein are suitable for use in larger applications.

Figure 1A:
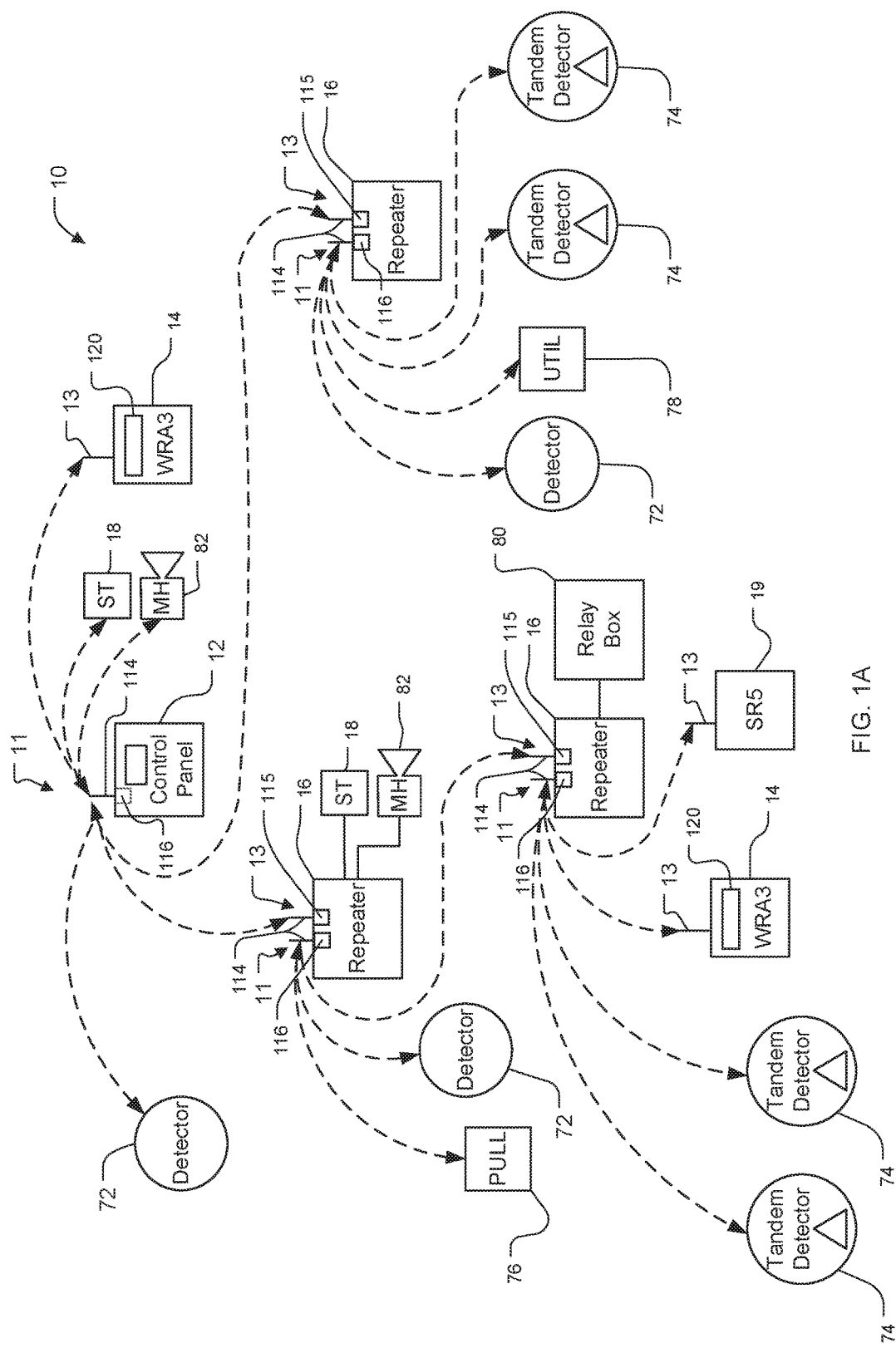
FIG. 1A is a schematic diagram of a wireless fire alarm notification system according to an embodiment of the present invention.

Turning now to the drawings, FIG. 1A is a schematic representation of a wireless monitoring and/or mass notification (e.g., wireless fire alarm notification) system, generally referenced as 10, in accordance with the present invention.

The wireless fire alarm notification system 10 includes a wireless enabled control panel 12 containing at least one microprocessor which functions as a master control center for the system 10. The control panel 12 includes a master interface 11 having an antenna 114 and a master transceiver 116. The master transceiver 116 enables RF data transmission via wireless links (represented as dashed lines) to an integrated repeater board of a wireless repeater device 16. The control panel uses the master transceiver 116 to broadcast alarm messages to and receive data from its slaves via its antenna 114 and the wireless links.

The system 10 further includes a plurality of annunciators 14 (e.g., WRA-3 wireless remote annunciators). The annunciators 14 are wireless slave devices that can function as limited control panels. The annunciators 14 include integrated display and user interfaces 120 to display alarm information and trouble status, and to perform acknowledgements, signal silence, and system reset anywhere within network communications.

The system 10 further includes a plurality of wireless repeater devices 16 (also referred to herein as parent repeaters, master repeaters, or repeaters). Each repeater 16 includes both a master interface 11 (antenna 114 and master transceiver 116) and a slave interface 13 (antenna 114 and slave transceiver 115). The slave interface 13 (particularly the slave transceiver 115 via the antenna 114) enables the repeater 16 to send and receive alarm messages via their inbound link to and from the control panel 12. Further, using its master interface 11 (particularly the master transceiver 116 via the antenna 114), each repeater 16 is capable of sending and receiving alarm messages on its link to and from devices that are enrolled as slaves to that repeater 16. Repeaters 16 also monitor and supervise enrolled slave devices which can be other repeater devices 16, annunciators 14, or any other slave device, such that the repeater 16 can send and/or receive wireless alarm messages to/from these slave devices as required based on their functionality. For example, as illustrated in FIG. 1A, the repeater 16 uses its slave transceiver 115 to receive alarm messages from the control panel 12 via another repeater 16.

In general, examples of slave devices include, without limitation, any of the following devices: detectors 72 (all types such as smoke detectors, heat detectors, or multimodality smoke/heat/CO/etc. detectors, carbon monoxide (CO) detectors), tandem detectors 74 (all types such as tandem smoke detectors, tandem heat detectors, tandem smoke/heat detectors, or tandem CO detectors), utility transmitters 78 (function as input contacts for event trigger), manual pull stations 76, wireless relay units 19 (e.g., SR-5 wireless relay units), notification devices (e.g., mini-horns 82, strobes 18, and horn/strobe combination units), annunciators 14, additional repeaters 16, or any other suitable notification device or initiating device which may be required for specific applications and/or to support product and industry growth in addition to changes in regulations and standards.

The slave devices have various functions within the system 10. The tandem detectors 74 are able to remotely activate a notification signal. Additional repeater devices 16 may be incorporated to extend effective signal range. Wireless relay units 19 may be incorporated to control miscellaneous attached devices. As illustrated in FIG. 1A, the repeater device 16 can be hardwired to a relay box 80 and the repeater device 16 can be hardwired to the strobe 18 and mini horn 82.

Messaging

As shown in FIG. 1B, embodiments of the fire alarm system 10 employ multiple frequency hopping patterns to pass messages back and forth between master device (e.g., repeater 16) and slave devices 14, 18, 19, 72, 74, 76, 78, 80, and 82 via wireless links. In this example, the wireless links are bi-directional wireless links enabling alarm messages to be sent or received between devices on the same wireless link. In particular, the wireless links are slots 130 of a frequency hopping spread spectrum (FHSS) links. The hopping pattern is structured in slots 130 to alternate between transmitting and receiving messages on each slot 130 such that balanced bi-directional communications are achieved. The effective data rate transmission speed is based on a BAUD rate that allows a fixed number of characters to be transmitted in each slot 130. A change in the BAUD rate could allow more or less characters to be transmitted/received in each slot 130. Message sizing is selected for optimal speed to meet UL notification time requirements which is 10 seconds or less from the initiating event while allowing a deep network depth of nested repeaters.

Communication through the system 10 is achieved using Layer 2 messages 126 and Layer 3 messages 128. All messages contain a Layer 2 message 126 and may contain one or more Layer 3 messages 128. Layer 3 messages 128 allow more detail to be transmitted. Outbound messages 132 are those messages sent by a master repeater 16, for example to its sub-network of slave devices 14, 18, 19, 72, 74, 76, 78, 80, and 82. Inbound messages 122 are those messages received by a repeater 16 from its sub-network. Either repeater 16 or slave devices 14, 18, 19, 72, 74, 76, 78, 80, and 82 listen to any message that contains its own device ID 134 in the Layer 2 Message or a broadcast message (e.g., beacon) which has a global ID (i.e. FF:FF:FF:FF:FF) as the destination device ID.

Message Structure

In accordance with a preferred embodiment, all messages contain a sequence number 136 matching their layer to prevent message duplication in the case where a required acknowledgement 138 is not returned with a matching sequence number 136. In this case, a retry procedure is initiated by the sending device that was expecting the acknowledgement 138. Global broadcast messages may or may not be acknowledged.

Messages further include a formatted structure that allows the system 10 to seamlessly pass messages on without having to decode each message unless its destination address matches. The structure of the messages and the device ID structure is configured to automatically handle the assorted device types and associated status information seamlessly, even allowing a new device type to be added into the different categories of devices. Typically, the device categories are 8, 16, and 32 bit devices, but the present invention is not limited to these three bits as additional bits could be added, e.g. 48 bits, 64 bits, etc. Typically, there is a status or action associated with the 8, 16, or 32 bit status byte(s).

There are different types of messages and structures for each message type with common header information to detail the source of the message, the destination of the message, the type of message, the layer and sequence number of the message, and size of the message. Multiple messages can be bundled in the same transmission. There are corresponding acknowledgement response types for these different types of messages as well and messages can be both inbound and outbound.

Message Hopping Control

FIG. 1C shows the self-configuration process performed by a master device as part of its initialization.

When a master device (e.g., repeater 16) is powered up, the repeater 16 uses its slave transceiver 115 to acquire the network code from its master (e.g., control panel 12) in step 510 and then passes the network code to the master transceiver 116 of repeater 16 via the main processor. The repeater 16 listens to the RF network for a specified maximum period of time and decodes any beacons it receives from, for example, the control panel 12 or other repeaters 16. In particular, the repeater 16 listens for beacons and determines the hopping patterns of those beacons in step 512. The master transceiver 116 of repeater 16 randomly selects an unused hopping pattern in step 514, and transmits its beacon in step 518.

On the other hand, as shown in FIG. 1D, when a slave device 14, 18, 19, 72, 74, 76, 78, 80, 82 powers up or fails all of its retry opportunities, the slave device 14, 18, 19, 72, 74, 76, 78, 80, 82 listens to the RF network on a specific initial frequency for a specified maximum period of time and decodes any beacons it receives in step 520. Depending upon the state of the slave device 14, 18, 19, 72, 74, 76, 78, 80, 82 (whether it has a network code or not) and the state of the sub-network (whether it is in enrollment or not), the slave device 14, 18, 19, 72, 74, 76, 78, 80, 82 begins either an enrollment procedure, a registration procedure, or continues with a system registration procedure in step 522. If the slave device 14, 18, 19, 72, 74, 76, 78, 80, 82 fails to find a suitable system, it selects a new frequency and repeats the system selection procedure in step 524. The slave device 14, 18, 19, 72, 74, 76, 78, 80, 82 ignores masters (e.g., master repeaters 16) that match its own device ID so that the slave device 14, 18, 19, 72, 74, 76, 78, 80, 82 does not join its own master repeater 16.

Enrollment

In an enrollment mode, new devices are powered up by the system 10 so that the new devices can be assigned a network code by the system 10. Each new device is added to a list of devices that its master (e.g., control panel 12 or master repeater 16) monitors and controls. The use of a unique network code allows multiple networks to be in RF range of each other without talking to each other and without messages from a first system being processed by a second system. Newly added device IDs for new devices are sent to the control panel 12 so that the control panel 12 knows which subnet the new device is currently assigned to.

Network Monitoring and Self-Healing

All devices check in on a periodic interval based on their device type, device status, and their last check-in time. All timings are based on maximizing power savings and meeting operational and standards requirements. When an event such as tamper, alarm, or other monitored condition/event occurs, the event is transmitted immediately and the check in period clock is reset as per the status of the device and the device type, in order to save power. Whenever a slave device fails to get an acknowledgement from its master (e.g., control panel 12 or master repeater 16) despite retries, the device begins the process of listening for a new master that it can join. If the device fails to either re-join its original master or a new master within 200 seconds, the control panel 12 reports a test fail for that failed device, for all the devices joined to the failed device on its subnet, and for all the devices that are associated on any subnets attached to the subnet of the failed device.

Programming

Devices that have a programmable output(s) are programmed on the control panel 12 to perform certain types of functions when specific events occur and these event notifications are received at either the repeater 16 or the control panel 12. Using either buttons on the control panel 12 or a software program/app on a personal computer/tablet/smart phone, etc., the end user can program system responses to certain events. For example, the end user can program the activation of horns 82 and strobes 18 in the case of a fire in a specified zone, zones, or the entire facility. In particular, the end user can program this activation to occur in response to, for example, a tripped heat detector 72, 74 or an occupant tripping a manual pull station 76. The foregoing is merely an example and not a limitation of the type of events that can be automatically detected, automatically triggered, or manually triggered by external events of the system 10 and the types of responses that can be activated through the assorted interfaces such as relays, notification activation circuits, software messages sent through the Internet, telephone lines, RF, etc.

User input program configurations are sent via RF messaging through the RF network to the master devices that either have the interfaces integrated into them, are attached to the RF network via control lines, or are slave devices that are part of the RF network subnet. Once the programming information is received by the master responsible for the destination device, the master processes the messages and acknowledges to the control panel 12 that the programming information has been received and properly processed.

Notifications and System Responses

When an external event that the system 10 is programmed to respond to occurs, it is not always necessary to send the event message data to the main control panel 12 before the system 10 starts responding. For example, if a tandem smoke detector 74 is tripped in a particular area/zone, the tripped tandem smoke detector 74 reports an alarm event message to the master repeater 16 of the tripped tandem smoke detector 74. The master repeater 16 passes the alarm event message to the control panel 12 through the parent subnets of the master repeater 16 for system level processing. Meanwhile, the master repeater 16 starts broadcasting an alarm event beacon containing the alarm status of that tripped programmed zone on its subnet. Any tandem detectors 74 in the subnet that are programmed on that tripped zone start annunciating an alarm when these tandem detectors 74 decode the alarm status without having to wait for a message to be broadcast from the control panel 12. This is one of many examples as each master repeater 16 is responsible for the event response in its subnet. Correspondingly, the same alarm event message can be broadcast down through the subnets of the master repeater. The additional master repeaters 16 in the subnets can broadcast the alarm beacon so additional tandem detectors 74 can start annunciating an alarm without having to wait for a response from the control panel 12. The types of responses can come from a variety notification devices including: sounders, strobes, relays, digital ASCII displays, etc., and any other possible alarm output device/mechanism.

System Beacon

A system beacon is broadcast through the entire RF network of the system 10. The beacon contains system status information that is/can be used by all devices. The beacon contains the current system-wide state of the system 10, current date and time, zone status, tandem status, system test mode status, initialization mode status, enrollment mode, network codes, etc. The beacon is not acknowledged but passed on down through each subnet to all devices in the system 10.

Wireless Notification Device Sync

In hardwired (i.e., non-wireless) fire alarm systems, alarm notification devices are hard wired in a signaling line circuit (SLC) loop and all of the devices on the loop are activated (i.e., turned on) when power is applied to the loop. A sync pulse is sent along the wire to synchronize the notification devices so that in the case of mini-horns, they beep in unison and in the case of strobes, they flash within 10 milli-seconds (ms) of each other. For wireless systems, however, a wireless mini-horn, for example, annunciates an alarm via an integrated horn when activated via a wireless RF signal from the control panel 12.

Figure 2A:
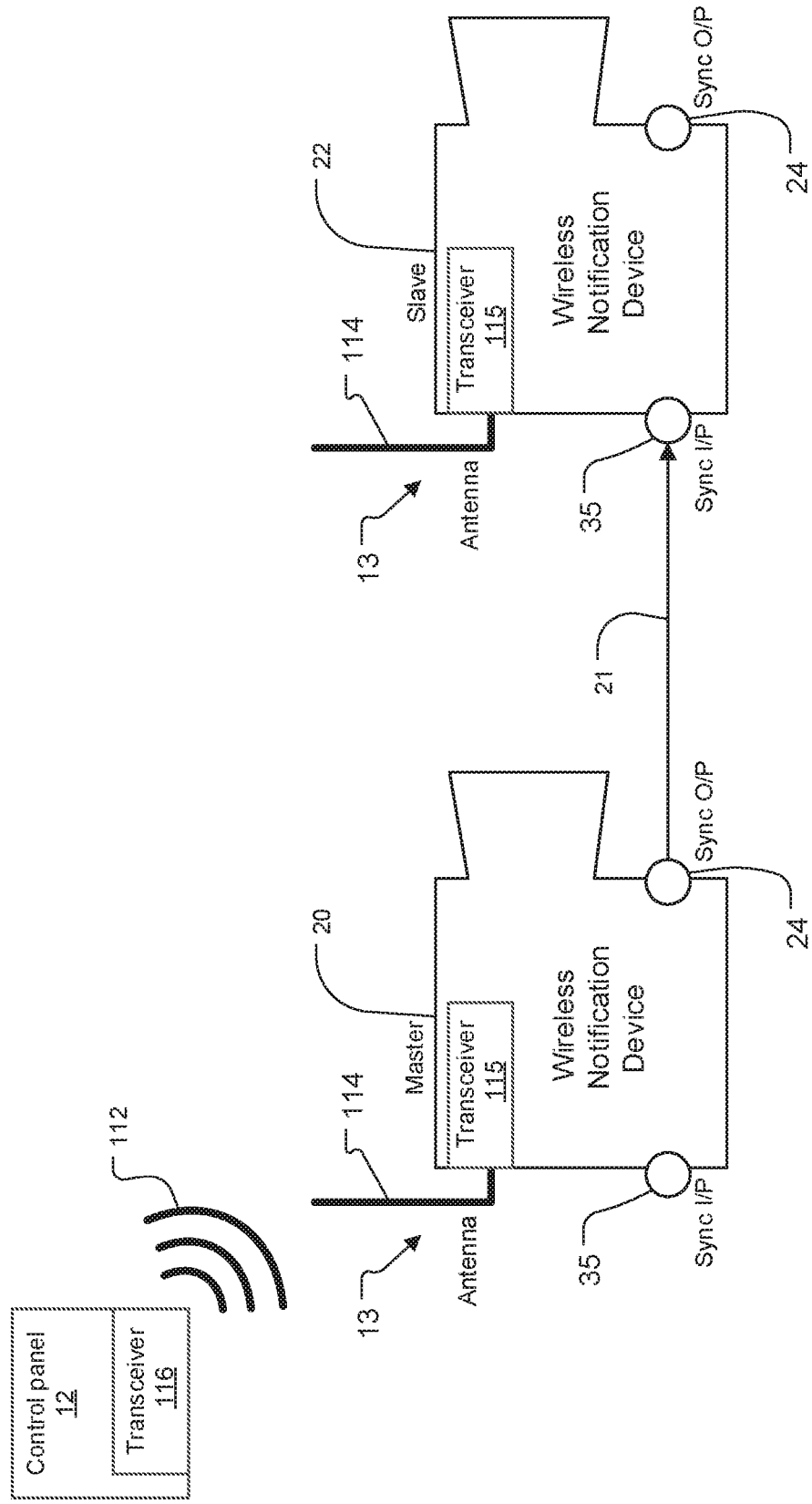
FIG. 2A is a schematic diagram of a master notification device using a sync pulse to synchronize a slave notification device.

FIG. 2A illustrates a configuration of a first/master wireless notification device 20 (e.g., mini-horn or strobe) that provides a local synchronization signal transmitted via a wire 21 to one or more secondary slave wireless notification devices 22 (e.g., mini-horns or strobes). Accordingly, the master notification device 20 can coordinate and form a local synchronized loop with multiple synchronized slave notification devices 22 comprised of self-powered horns or strobes. This advancement further allows for an expansion of the number of annunciating devices past the limit of 2,048 RF devices on the control panel 12 as the additional slave devices do not necessarily require RF modules. The master notification device 20 annunciates an alarm signal 112 via an integrated horn/strobe when activated via a wireless RF signal from the control panel 12. The master notification device 20 and the slave notification device 22 are self-powered. Each notification device 20, 22 can connect via its own RF link to the control panel 12. In particular, each notification device 20, 22 includes a slave interface 13 (antenna 14 and slave transceiver 115) that allows for communication of alarm signals 112 or other system information to or from the master transceiver 116 of the control panel 12.

In more detail, each notification device 20, 22 has a sync-input pin 35 and a one or more sync-output pins 24. The master notification device 20 has its sync-output pin 24 connected to the sync-input pin 35 of the notification device 22, chosen to be a slave notification device. The wire 21 is connected to the sync output pin 24 on the master notification device 20 and to the sync input pin 35 on the slave notification device 22. The output sync pulse is sent from the master notification device 20 to the slave notification device 22.

Figure 2B:
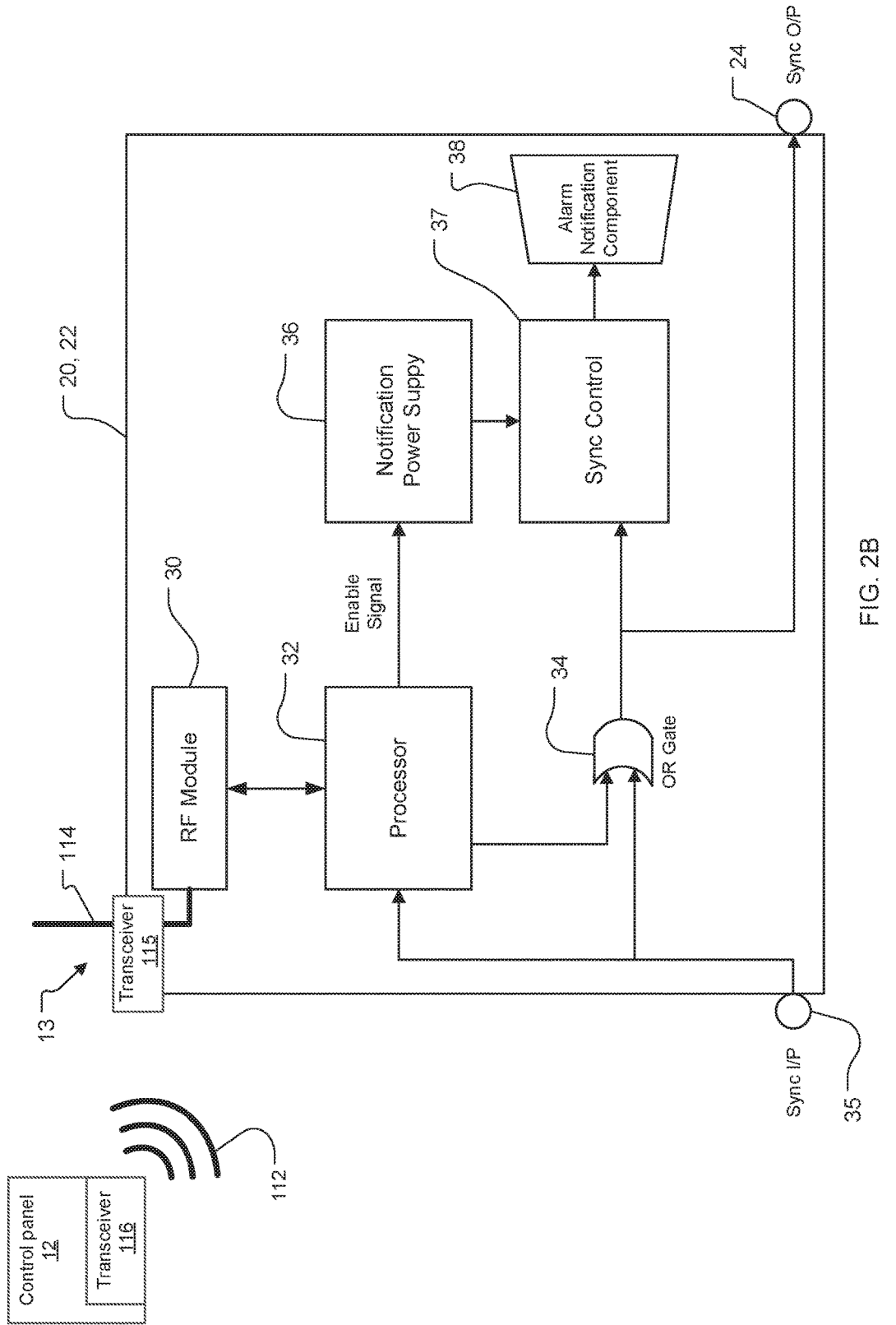
FIG. 2B is a schematic hardware block diagram of the master/slave notification device of FIG. 2A.

FIG. 2B illustrates the main components of the notification device 20, 22 with respect to the synchronization feature.

The notification device 20, 22 includes an RF module 30 for receiving the alarm signal 112 from the control panel 12 via the slave transceiver 115. The RF module 30 feeds the alarm signal 112 to a microprocessor or processor 32. A sync signal, received at the sync input pin 35, is directed to the processor 32 and is fed to a first pin of a two input OR gate 34. The second pin on the OR gate 34 is fed from the processor 32 so that the processor 32 can initiate a sync pulse upon the received alarm signal 112 from the RF module 30. As a result, the master notification device 20 can generate the synchronization signal based on a synchronization signal received via a wired connection at the sync input pin 35 or a wireless link via the RF module 30, respectively.

Preferably, each notification device 20, 22 is identical and can function as either a master or a slave depending upon how the notification device 20, 22 is wired. However, in other examples, the notification devices can be dedicated master devices and/or dedicated slave devices.

The processor 32 enables (using an enable signal) the notification power supply 36 as needed based on either detection of the sync signal from the master notification device 20 via sync input 35, or detection of the alarm signal 112 (including a synchronization command) from the RF module 30. The output of the OR gate 34 feeds into the sync control module 37. The sync control module 37 controls distribution of power from the notification power supply 36 to an alarm notification component 38 (e.g., sounder and/or strobe). For example, when the alarm signal 112 is received via the RF module 30, the processor 32 enables (i.e., turns on) the notification power supply 36 and the sync signal sent from the OR gate 34 via the sync input 35 (detected sync signal) or the processor 32 (alarm signal 112 includes synchronization command) causes the sync control module 37 to provide temporal sync timing to the alarm notification component 38. The sync control module 37 drives the alarm notification component 38 based on receiving the sync signal from the OR gate. The sync control module 27 maintains synchronization between the sounding and/or flashing of the alarm notification component 38 and the receiving of the synchronization signal. The output of the OR gate 34 also feeds into the sync output pin 24 to pass the synchronization signal directly onto another slaved notification device 22. The number of slaved notification devices 22 that can be daisy-chained is only limited by the cumulative propagation delay of the OR gates which is typically 1 to 2 nano-seconds.

When present, the sync signal feeds into the processor 32 so that the processor 32 knows a master sync pulse is providing the synchronization. This also eliminates any time delays since processing time is not required by the processor 32 except for activating (i.e., turning on) the notification power supply 36. When the master sync pulse is present, the processor 32 of the slave notification device 22 does not generate a sync pulse of its own. If the master notification device 20 falls off the RF network or has some other failure, the slave notification device 22 can still activate (i.e., turn on) its own attached alarm notification component 38 as the master sync pulse is not present and network redundancy is maintained as illustrated in FIG. 2B.

The sync signal can be used as a heartbeat to verify that the wire between master notification device 20 and slave notification device 22 is not broken (i.e., validate wired connection) and to verify that there are not multiple master notification devices 20 on the same sync wire. Each notification device 20, 22 has a selection jumper that is read on power-up that commands the notification device 20, 22 to operate as a master notification device 20 or as a slave notification device 22. The sync signal from the master notification device 20 is fed into the processors 32 of all attached slave notification devices 22, and when not in alarm this sync signal is sent out as a status heartbeat. If a slave notification device 22 does not receive a status heartbeat every 90 seconds, the slave notification device 22 reports a trouble to the control panel 12. If a master notification device 20 receives a heartbeat from another notification device, the master notification device 20 sends a fault to the control panel 12 reporting that two devices or more have been configured as master notification devices.

Tandem Activation

Tandem devices such as tandem detectors 74 and notification devices (e.g., audio/visual devices such as mini-horns 82, strobes 18, or horn/strobe combo devices) are typically notified that they need to activate their sounders or flash lights when one of their zones is activated. For example, currently tandem smoke detectors need to query their parent repeater to learn if their sounder should be active ("on") or inactive ("off"). This should be done in an efficient enough manner to meet timing and bandwidth limitations of the system 10. This presents a problem as there is a limited amount of bandwidth available to handle these queries. At some point, there will be too many tandem devices and the tandem devices will not all be able query their state causing tandem devices to randomly sound when the tandem devices should not be sounding.

Thus, another significant aspect of the system 10 of the present invention involves configuring the parent repeater 16 to broadcast a sounder state after a beacon message, rather than having tandem devices query their parent repeater 16. In general, the present invention offers a method for activating and deactivating child tandem devices (e.g., turning "on" or "off" mini-horns 82 or strobes 18) without the child tandem devices having to query their parent repeater.

In accordance with this aspect, when the child tandem device registers (e.g., sends a registration request) to its parent repeater 16, the parent repeater 16 sends a Local ID Assignment message in response. The Local ID Assignment message includes an identification address associated with the child tandem device for distinguishing the child tandem device from other child devices in a subnet of the parent repeater 16. In the alternative, a tandem device can also query its Local ID Assignment.

Figure 3B:
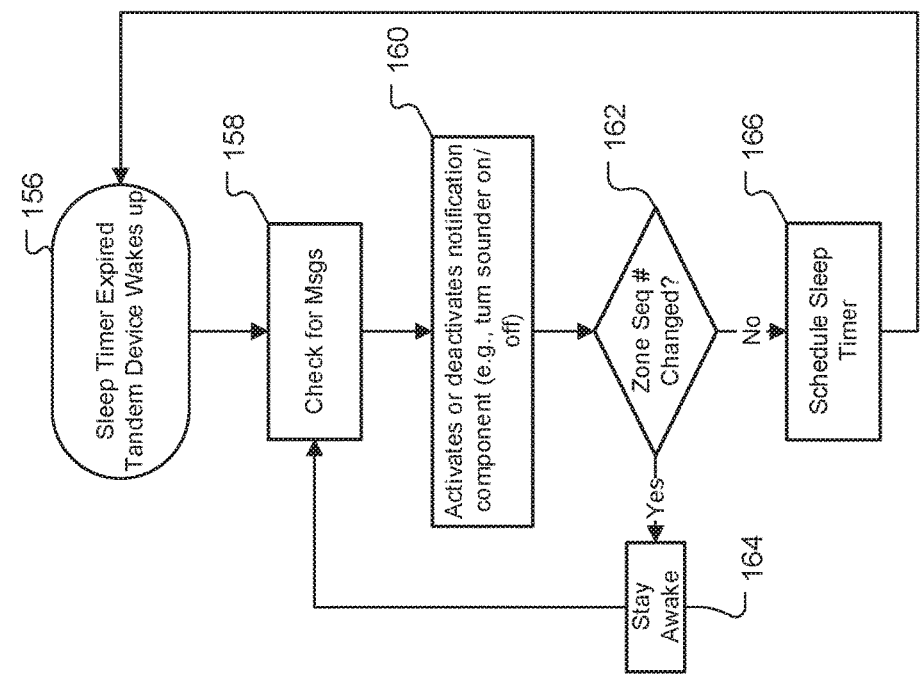
FIGS. 3A-3B are flow charts illustrating a tandem activation process between a parent repeater and a child device.
Figure 3A:
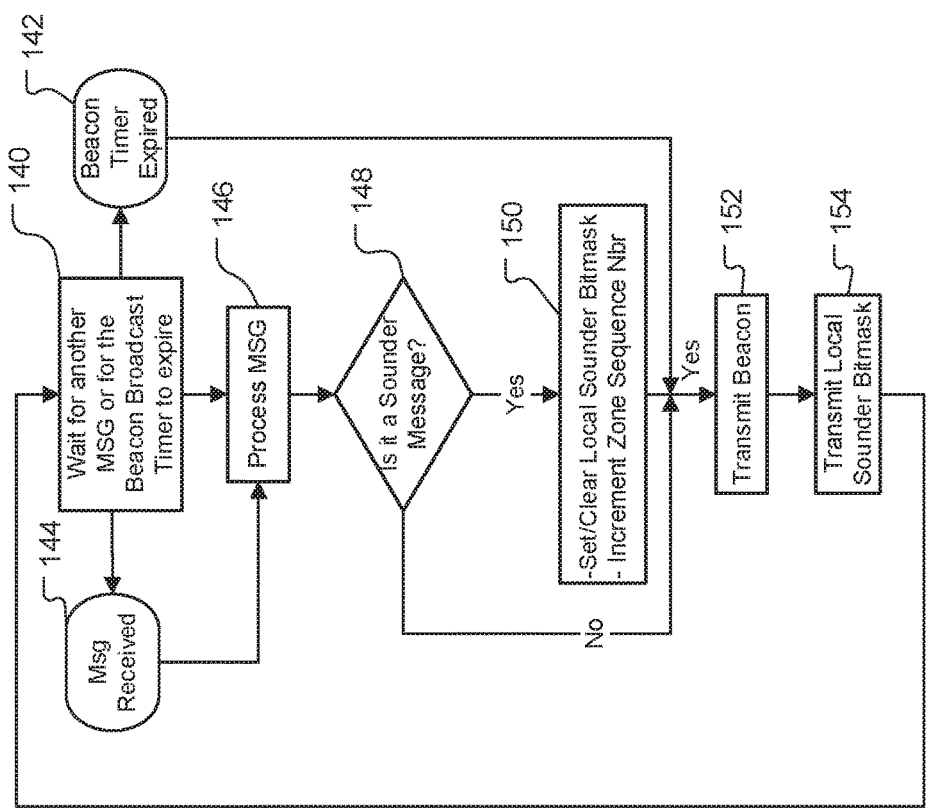

FIG. 3A illustrates the operation of the parent repeaters 16 with respect to activation/deactivation of the child tandem device such as a sounder device or mini horn 82. In general, the repeater devices 16 wait in step 140 until they receive a message to generate an alarm or it is time to broadcast their next beacon.

If the timer to broadcast the next beacon expires, as determined in step 142, the beacon is transmitted in step 152 and a notification activation message such as a sounder activation message (includes a local sounder bitmask) is transmitted in step 154. The local sounder bitmask lists the notification state for each child sounder device of the subnet for the repeater device 16.

On the other hand, when it is determined that a message has been received in step 144, this received message is processed in step 146. In step 148, the message is determined to be a sounder message signaling activation of notification devices (e.g., sounders such as mini horns 82). Then, the parent repeater 16 sets the local sounder bitmask in step 150. Then, the beacon is transmitted in step 152 and the local sounder bitmask is transmitted in step 154. If the message is determined not to be the sounder message, then step 150 is skipped and the parent repeater 16 transmits the beacon and the local sounder bitmask) in steps 152 and 154.

As described above, the local sounder bitmask is sent within the sounder activation message. The local sounder bitmask tells all sounder devices, such as mini horns 82, their sounder state. As appreciated by one of skill in the art, other types of bitmasks can be included in the activation message that tells other types of tandem devices such as strobes 18 their activation states.

When a tandem device (e.g., A/V device or mini horn 82) joins a repeater 16 in the system 10, the tandem device is assigned an 8-bit Local ID (identification address) that is used to uniquely identify that tandem device within the subnet of the parent repeater 16. The Local ID is sent to the tandem device using the Local ID Assignment message as described above. If the tandem device does not receive the Local ID Assignment message due to transmission errors, the tandem device will periodically request the assignment message using a Local ID request message. When a new zone is activated, parent repeaters 16 determine which child tandem devices, if any, need to be activated. Parent repeaters 16 maintain a bitmask with enough bits for each child tandem device to have one bit. The index of a child tandem device's bit in the bitmask is the Local ID.

When a tandem device is to be activated, its bit (local ID) in the bitmask is set to one (otherwise the bit is set to zero when the tandem device is inactive).

If one or more of its child tandem devices are active, the repeater 16 will broadcast a sounder activation message that contains the local sounder bitmask in step 154. This activation message is sent immediately following the transmission of the beacon in step 152. This activation message type is relevant for the subnet only and is not propagated throughout the network of the system 10.

FIG. 3B illustrates the operation of the tandem device (e.g., sounder device such as the mini horn 82).

In general, the tandem devices are asleep, until they awake in step 156. Then, the tandem devices check for any new messages from their repeaters 16 in step 158. In step 160, the tandem devices activate or deactivate their notification component (e.g., turn on/off sounder for mini horns 82) based on the notification activation messages received from the repeaters 16. The notification activation messages, received in step 158 from the repeaters 16, include instructions on whether to activate or deactivate the tandem devices.

In order to save power, tandem devices do not normally stay awake to receive the activation message. Thus, when the contents of the activation message change, the repeater 16 changes the zone sequence number in the beacon. In step 162, the tandem device determines whether or not the zone sequence number has changed. In step 164, the child tandem devices stay in an awake mode in response to the positive determination in step 162 that the zone sequence number has changed. That is, the tandem devices interpret the change in the zone sequence number in the beacon as an instruction to stay awake to listen for the activation message. In step 166, the tandem device schedules a sleep timer in response to the negative determination in step 162 that the zone sequence number has not changed. In summary, the parent repeater 16 can transmit a beacon message that signals the child tandem device to wake-up from sleep mode and listen for notification activation messages.

Battery Load Check on Active Circuit

Figure 4A:
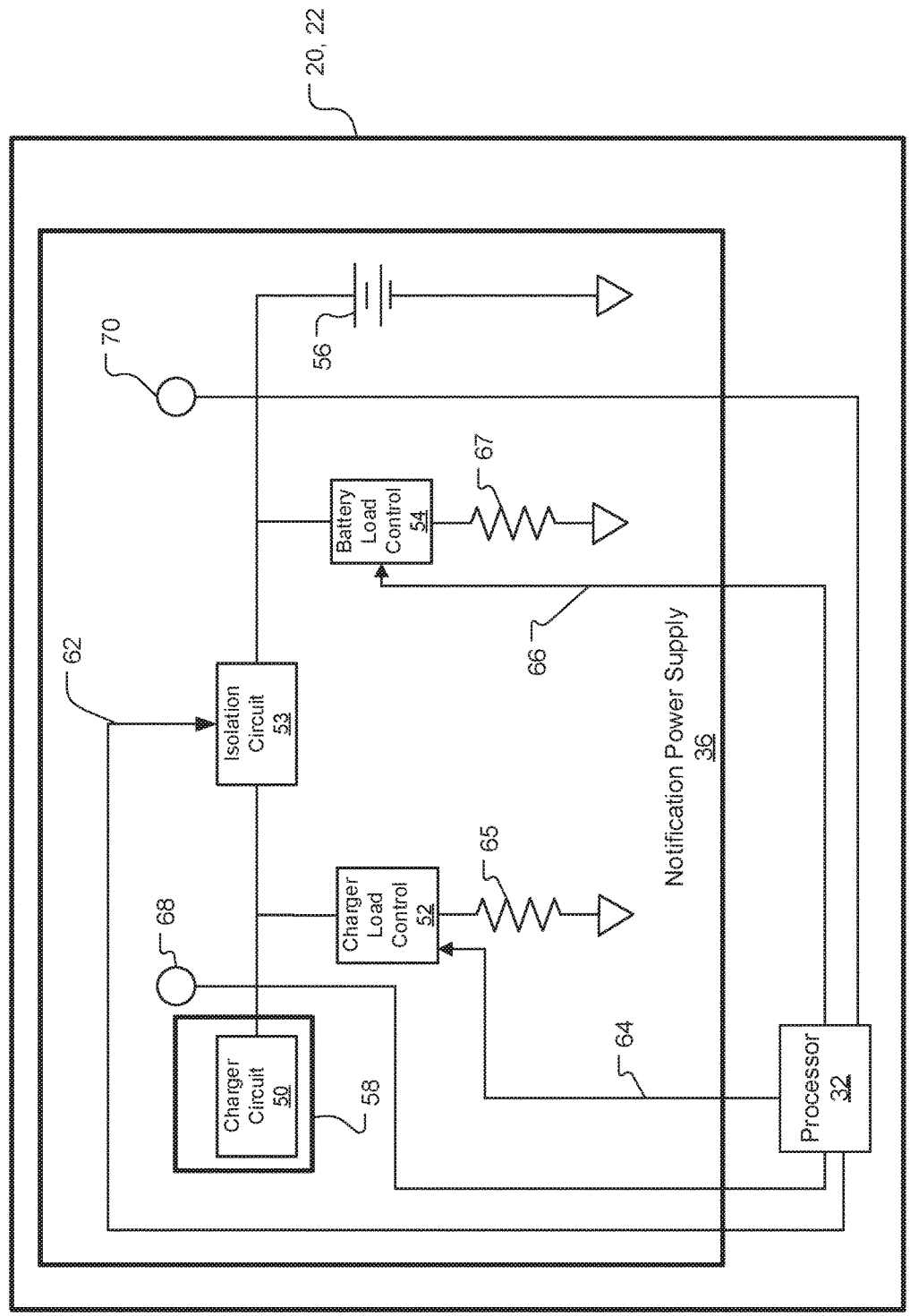
FIG. 4A is a block diagram of a circuit for testing the integrity of a battery charger, a battery, and an isolation circuit.
Figure 4B:
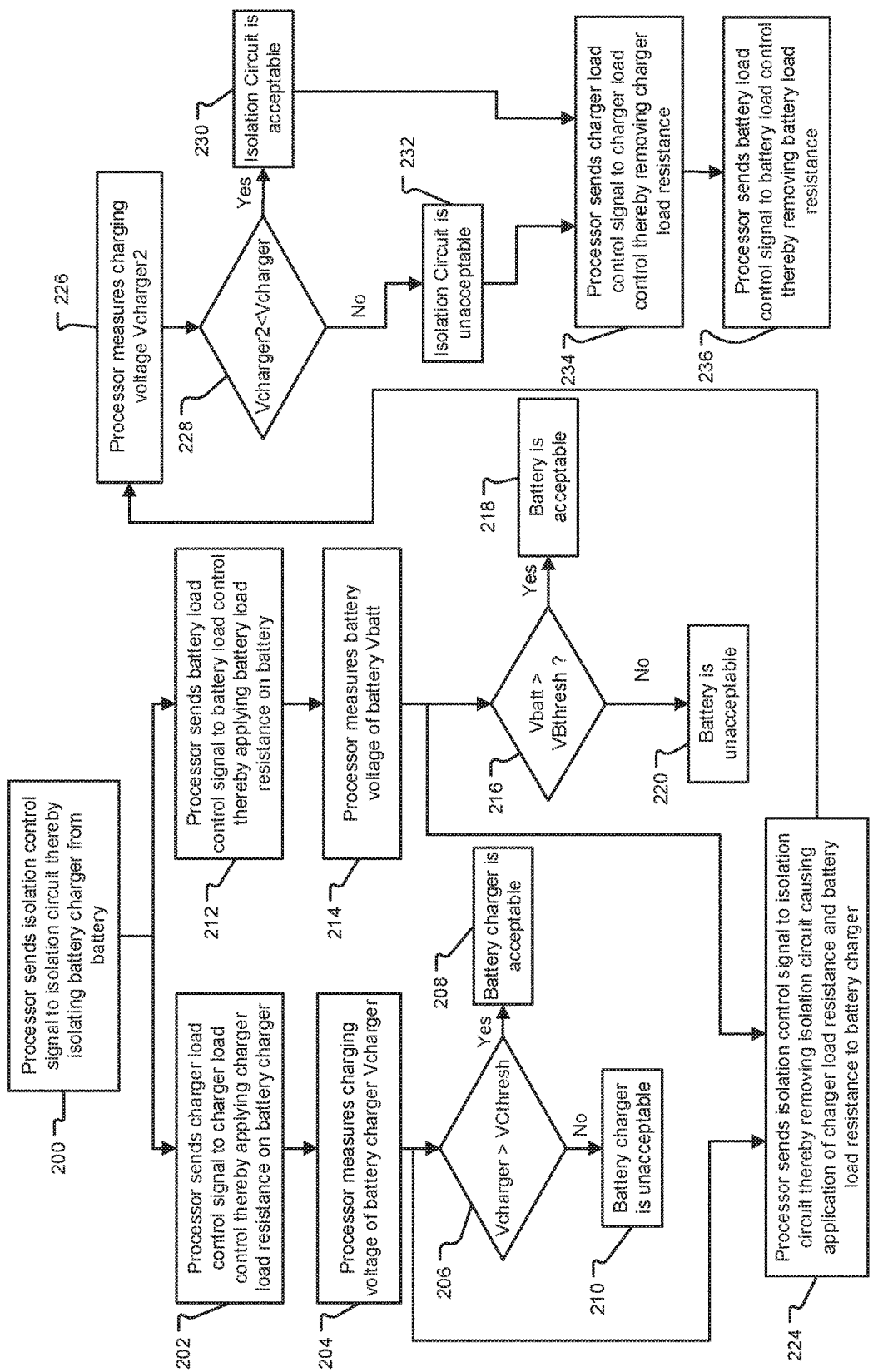
FIG. 4B is a flow chart illustrating the process of testing the integrity of the battery charger, the battery, and/or the isolation circuit of FIG. 4A.

FIGS. 4A and 4B show a circuit and a method for testing and verifying the integrity of an active battery charger 58, a battery 56, and a battery charger isolation circuit 53, even when the battery charger circuit 50 is operational and charging the battery 56. This method and circuit can be used in devices such as repeaters 16, notification devices 18, 82, and initiation devices 72, 74 to maintain their backup batteries, for example. In the illustrated example of FIG. 4A, the circuit is used within the notification power supply 36 of the master/slave notification device 20, 22.

As illustrated, the battery charger circuit 50 of the battery charger 58 is electrically connected to a charger load control 52, and further connected to a battery load control 54 and the battery 56 via an isolation circuit 53. Using a combination of control signals from the microprocessor 32 of the device and analog/digital monitoring test nodes 68, 70, the integrity of the above circuitry can be verified while operating.

The processor 32 sends an isolation control signal that deactivates (i.e., turns off) a voltage pass-thru isolation circuit 53 to isolate the charger circuit 50 of the battery charger 58 from the battery 56 in step 200. Next, the processor 32 sends a charger load control signal to activate (i.e., turn on) a switch such as a MOSFET of the charger load control 52 causing it to apply a charger load 65 (i.e., charger load resistance), such as a power resistor, to the charger circuit 50 in step 202. In step 204, the output voltage Vcharger of the charger circuit 50 is measured at the charger voltage test node 68 using an analog to digital converter. Then, the measured voltage Vcharger at the charger voltage test node 68 is compared to an acceptable threshold voltage VCthresh (i.e., required charging voltage) for the battery charger 58 in step 206 and the charger is then determined to be acceptable or unacceptable in steps 208 and 210. This confirms that the battery charger 58 is able to supply the acceptable threshold voltage VCthresh at the required load. In addition, simultaneously with the testing of the battery charger 58, a battery load control signal activates (i.e., turns on) a switch such as a MOSFET in the battery load control 54 to apply a battery load 67 (i.e., battery load resistance), such as a power resistor, to the battery 56 in step 212. The battery voltage Vbatt is measured at the battery voltage test node 70 using an analog to digital converter in step 214. Then, the measured voltage Vbatt is compared to an acceptable threshold voltage VBthresh for the battery 56 in step 216 and the battery 56 is then determined to be acceptable or unacceptable in steps 218 and 220, respectively. This confirms that battery 56 is able to supply the acceptable threshold voltage VBthresh at the required load.

Finally, the processor 32 sends the isolation control signal to activate (turn on) the voltage pass-thru isolation circuit 53 thereby removing the isolation circuit 53 causing application of both the charger load 65 (i.e., charger load resistance) and the battery load 67 (i.e., battery load resistance) to the charger circuit 50 of the battery charger 58 in step 224. This effectively doubles the load on the battery charger circuit 50, exceeding its current limited capacity, and the output voltage of the battery charger 58 drops. The overloaded charger voltage Vcharger2 is again measured in step 226. Then, in step 228, the charger voltage Vcharger2 measured in step 226 is compared to the charger voltage Vcharger with the isolation present. In steps 230 and 232, it is determined whether the charger voltage Vcharger2 has dropped from the charger voltage Vcharger with the isolation present, Vcharger2<Vcharger. This drop in voltage confirms that the isolation circuit 53 is working to: (a) isolate the battery charger 58 from the battery 56; and (b) allow the charging voltage Vcharger to be applied to the battery 56 to charge it.

In this way, the operation of the battery charger 58, the battery 56, and the isolation circuit 53 are validated.

Finally, in step 234, the processor 32 sends the charger load control signal deactivating (turns off) the charger load control 52 to remove the charger load 65. And, in step 236, the processor 32 sends the battery control signal deactivating (turns off) the battery load control 54 to remove the battery load 67.

Event Status Notify

Figure 5:
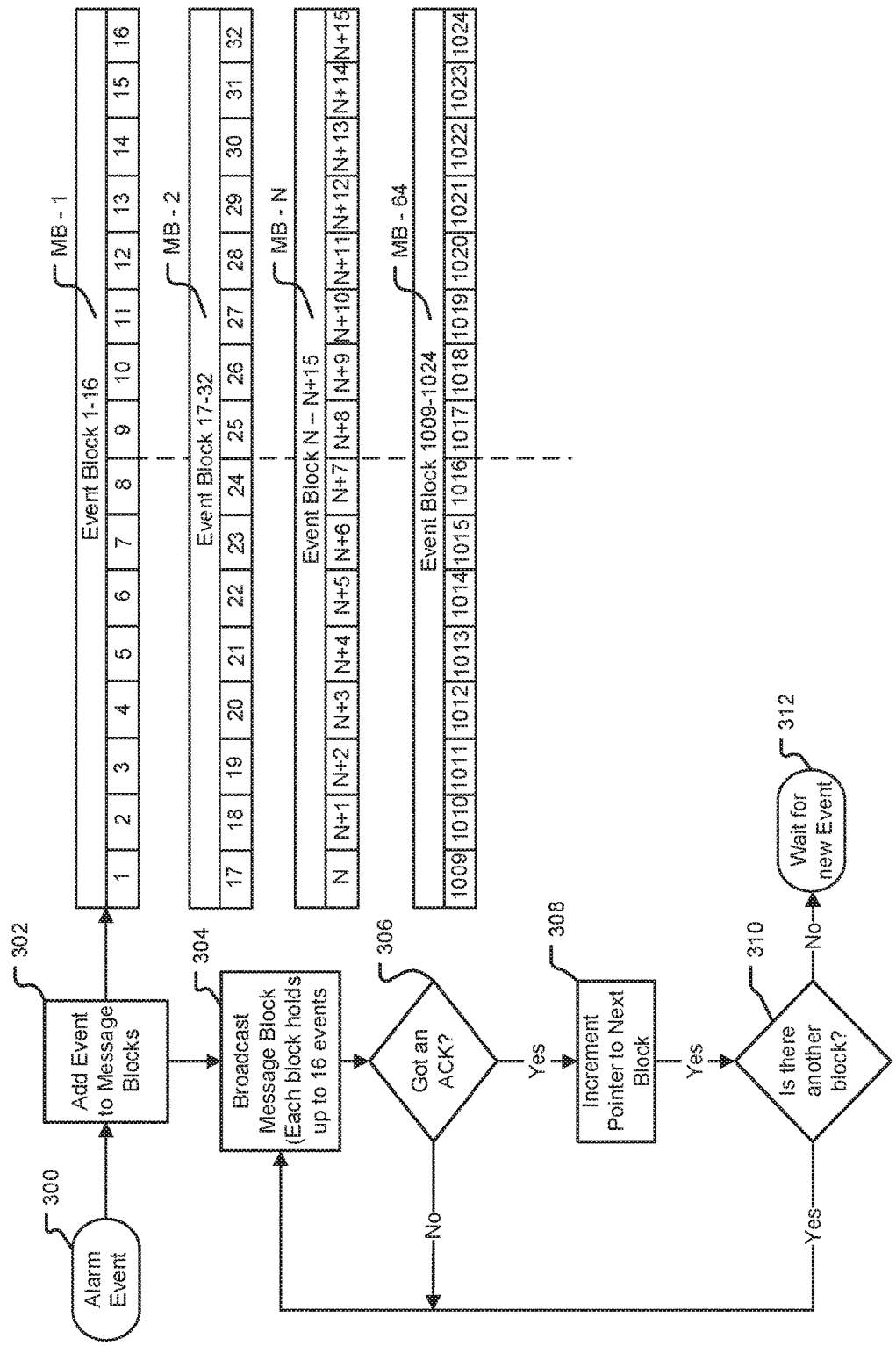
FIG. 5 is a flow chart of a method for sending alarm events according to an embodiment of the present invention.

FIG. 5 depicts yet another significant aspect of the present invention, namely the ability of the control panel 12 to send up to 2,048 alarm events to up to 8 annunciators 14 without overloading the RF link. Wireless fire alarm systems have limited bandwidth available for "panel-to-device" out of band messaging without adversely affecting the inbound data link which is required to meet the 10 second rule. Annunciators 14 need to send the alarm state of the overall system and must receive the first alarm indication within that same 10 seconds. In order to send the alarm information to multiple annunciators 14 (up to 8) without delaying alarms going to the control panel 12, a method is required that limits the RF being used to send the alarm information.

The present invention addresses this limitation by sending events in blocks of 16 as illustrated in FIG. 5. In particular, the presentation invention provides a method for avoiding RF link overload in an RF network such that 2,048 possible devices can be enrolled and 2,048 alarm events can be broadcasted to 8 annunciators simultaneously. It is further contemplated that the present invention may be expanded to handle a greater number of alarm events in excess of 2,048 alarm events and more annunciators. In this method, events can be broadcasted in blocks of 16 thereby allowing the annunciators 14 to acknowledge each block, and additional events are transmitted in blocks of 16 as needed. This method reduces RF network traffic keeping the system dynamic and able to respond in real-time to new events/ alarms.

In more detail, alarm events are received in step 300 by the control panel 12 and these events are added to message blocks MB-N in step 302. These message blocks MB-N store a range of different events. For example, the first 16 events are accumulated in a first message block MB-1, and the subsequent groups of up to 16 events are accumulated in subsequent blocks MB-2, MB-N. Alarm events are accumulated over some finite time, such as less than 10 seconds by the control panel 12.

When the message blocks are full or the time limit over which alarm events are accumulated expires, then the control panel 12 broadcasts the message blocks MB-N to all annunciators 14 in step 304. Only one message is sent for all annunciators 14. Each annunciator replies with a Layer 3 Event Notify Acknowledgement. In step 306, it is determined whether all of the annunciators 14 have replied with the acknowledgement. In the situation where not all of the acknowledgements have been received, then the message block MB-N is rebroadcast in step 304.

Finally, the control panel 12 increments to a subsequent message block in step 308, and if that message block exists as determined in step 310, then the next message block is sent in step 304. Otherwise, in step 312, the control panel 12 waits for the next alarm events and begins accumulating those events into the next message block.

In order to keep the annunciators 14 synchronized with the control panel 12, the control panel 12 broadcasts Event Status Notify messages when system alarm or trouble conditions change. The message blocks can be broadcasted within the Event Status Notify messages. Each Event Status Notify message contains the current Alarm LED status, Trouble LED status, Supervisory LED status, Signal Silence LED status, and/or number of devices listed in alarm state. Annunciators 14 use this information to update their LEDs and integrated display device and user interfaces 120.

Event Status Notify messages also contain the device table index of any device that is in alarm state. Due to system limitations, only 16 indexes (events) can be sent per message. Thus, the list of system events is segmented into groups of 16, ordered by time of occurrence, and sent in sequential Event Status Notify messages. Each Event Status Notify message contains information so the annunciator 14 knows which segment is contained in the message and how many events are in the message.

Programming Checksum Method

Figure 6:
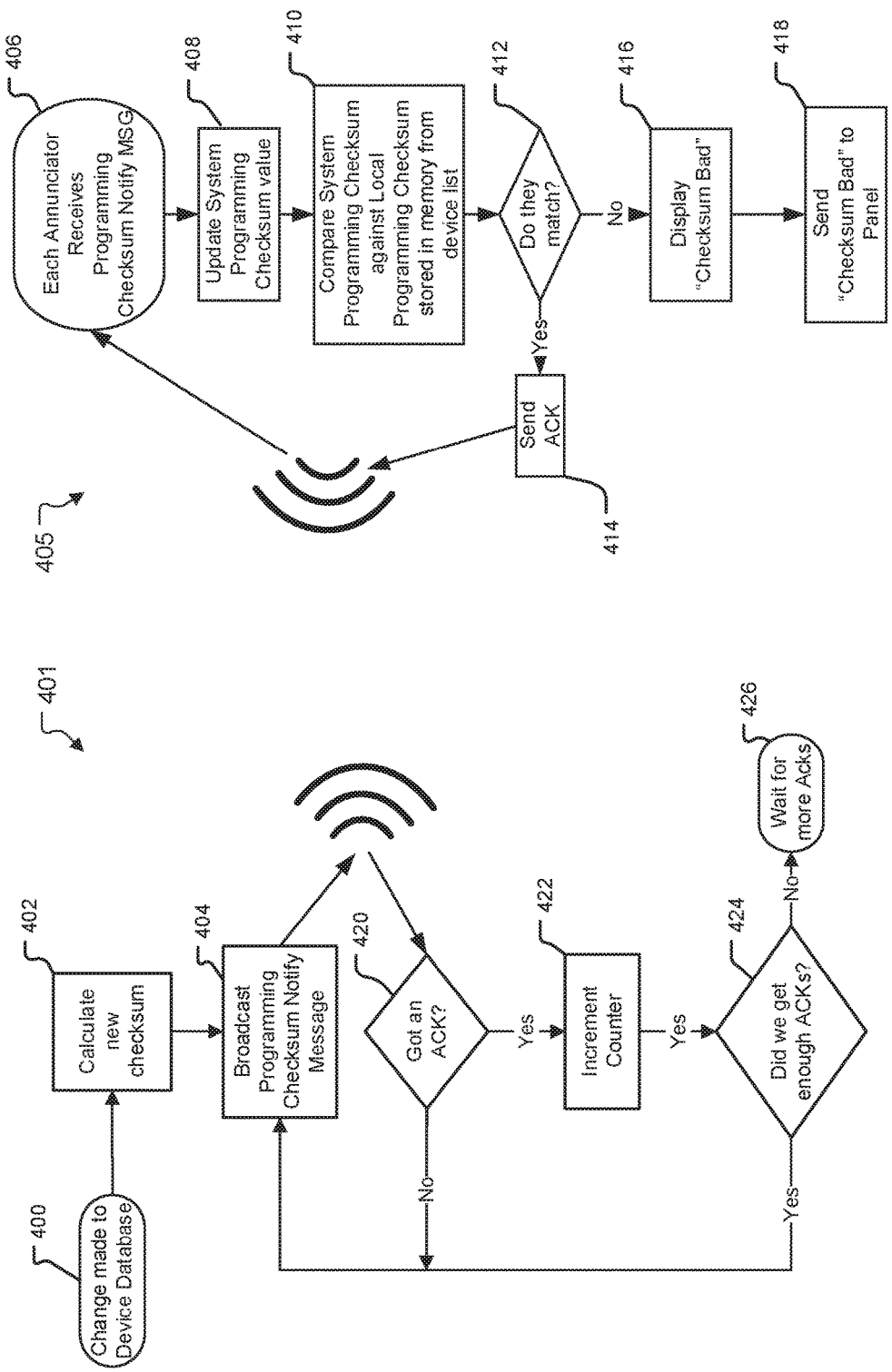
FIG. 6 are flow charts of a programming checksum method for confirming that the annunciator has the same programming information as the control panel according to an embodiment of the present invention.

A further significant aspect of the present invention relates to a method for confirming that annunciators 14 in the system 10 have the same programming information as the control panel 12 in order to display the proper device information and location. FIG. 6 provides a flowchart depiction of a programming checksum method that enables such confirmation. In general, whenever a new device is added to the system 10, the programming checksum is changed. Annunciators 14 are maintained in a synchronized state with the control panel 12 by receiving broadcasts from the control panel 12 of a programming checksum notify message when the device programming information has been changed. This programming checksum notify message can include an updated checksum and updated system time. In general, the broadcasted checksum is compared in each annunciator 14, and if it does not match, an error message is sent to the control panel 12 to indicate that the annunciator 14 has not been programmed with the new devices. The broadcasted system time is used to synchronize the annunciator clocks of the annunciators 14 to the control panel 12.

In more detail, FIG. 6 illustrates a control panel flow chart 401 and an annunciator flow chart 405. The control panel 12, in step 400, determines whether a change has been made to the device database. Then in step 402, the control panel 12 calculates a new checksum for the data in its device database. In step 404, a broadcast programming checksum notify message is sent to all of the annunciators 14. The programming checksum notify message includes a system programming checksum that describes the changed programming information for example. In particular, this message contains the checksum calculated based on the data of the device database. The programming checksum notify can be broadcasted to multiple annunciators 14 in the form of one message.

The annunciators 14, in step 406, each receive the programming checksum notify message. This programming checksum notify message contains a checksum of the programming information. In addition to the checksum of the programming information, the programming checksum notify message also contains the current clock settings for the control panel 12 so that the integrated display and user interfaces 120 of the annunciator 14 are synchronized with the control panel 12. In step 408, the annunciator 14 updates its system programming checksum value with the latest value received from the originating control panel 12. In particular, the annunciator can update local time with system time in order to synchronize an annunciator clock with a control panel clock. In one example, the annunciator 14 displays device information and location information matching the control panel 12 and is verified via matching checksums. Then, in step 410, the annunciator 14 compares the system programming checksum against the local programming checksum stored in memory from the device list.

In step 412, the checksum from the control panel 12 is compared to the local checksum calculated by the annunciator 14. If there is a match, then an acknowledgment message (e.g., Layer 3 programming event notify acknowledgement) is sent in step 414 to the control panel 12. The control panel 12 receives back the acknowledgment messages from the annunciators 14 in step 420. In step 422, the control panel 12 increments a counter for each acknowledgment message received. If the control panel 12 does not receive back any acknowledgment messages in step 420, the control panel 12 rebroadcasts the programming checksum notify message in step 404. In step 424, the control panel 12 determines if acknowledgement messages were received back from every annunciator 14 in its subnet. If enough acknowledgment messages were received, the control panel 12 periodically rebroadcasts the programming checksum notify message in step 404 as a continuous checksum verification. If not enough acknowledgment messages were received, the control panel 12 waits for more acknowledgment messages in step 426.

On the other hand, if the checksums do not match, the annunciator 14 displays a "Checksum Bad" (error message) in step 416 and sends the error message in its inbound status message in step 418. This error message can include information on the programming mismatch. The method is summarized as follows: (a) control panel 12 sends a programming checksum notify whenever the programming information changes; (b) only 1 message is sent for all annunciators 14; and (c) each annunciator 14 replies with a Layer 3 programming event notify acknowledgement.

Device Type Processing

The present invention further addresses limitations in the art relating to the adding of new devices to the system 10, which currently requires the repeaters and receivers in the network to be modified in order to know how to process incoming device status messages. More particularly, devices sending status messages into the system 10 can have different types of status information in their status messages. All status messages are typically 16-bits of information but the meaning of those bits changes based on the type of device sending status messages. Current systems have been known to define 2 types of statuses, namely, an 8-bit status in which the other 8-bits of available space are used for system flags, and a full 16-bit status in which every bit is used for status. When a device such as a smoke detector sends status messages, it uses the 8-bit status. On the other hand, when a device such as an annunciator sends status messages, it uses a 16-bit status. Repeaters within a system need to know how to decode a status message—whether it is 8-bit or 16-bit, and thus the repeaters had this information hard coded based on specific device identification bytes (e.g. 06 or 0A is 16-bit, everything else is 8-bit) in prior art systems.

The present invention addresses this limitation by encoding into the device ID data of the device itself, rather than requiring modification of the repeater and/or receiver for each new device. Further, the present invention provides a method which adds protocol to automatically process messages from new devices of an existing network without having to hardcode repeaters 16 to support these new devices. New devices need only be added to the control panel software as the repeater network can automatically handle the different types of messages from devices based on a serial number prefix which groups types of devices and their corresponding message formats automatically.

Figure 7A:
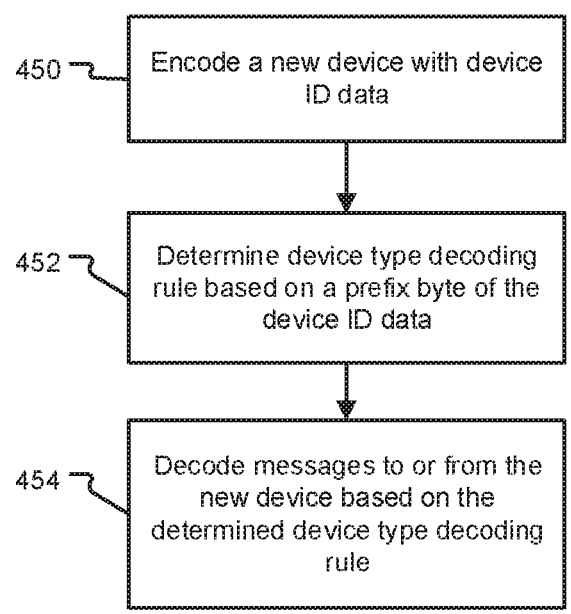
FIG. 7A is a flow chart of a method for processing messages for a new device of a fire alarm system according to an embodiment of the present invention.

In accordance with this significant aspect of the present invention, as illustrated in FIG. 7A, in step 450, the new devices are encoded with their respective device ID data. The device ID data, for example, is a serial number having a prefix byte that correlates with a device type decoding rule for messaging. Then, when messages are received by a repeater 16 or a control panel 12, the device decoding rule is determined from decoding the first byte (prefix byte) of the device ID data in step 452. Then, the message is decoded based on the determined device type decoding rule in step 454. Steps 450-454 may be implemented by a processor.

Figure 7B:
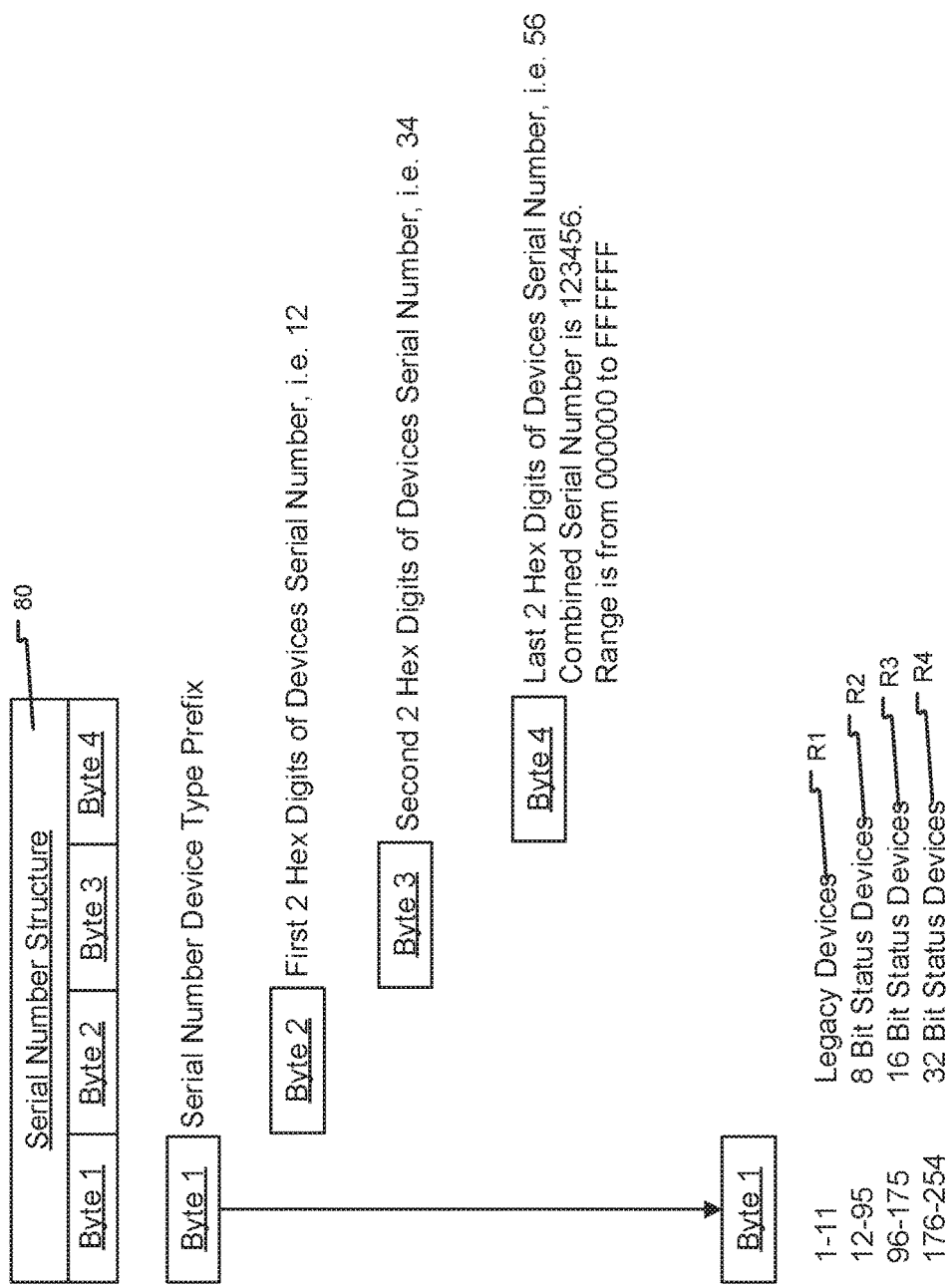
FIG. 7B is a schematic diagram of a structure for device identification data used in processing messages according to the method of FIG. 7A.

As illustrated in FIG. 7B, the prefix byte of the device's 4-byte serial number 80 is divided into ranges such that simply knowing the prefix byte allows the system to know how to properly decode the status message. As illustrated below, prefix bytes with values 1-11 are treated as legacy devices R1 and use the existing hard coded rules; prefix bytes with values 12-95 are decoded as 8-bit status devices R2; prefix bytes with values 96-175 are decoded as 16-bit status devices R3; and prefix bytes with values 176-254 are decoded as 32-bit status devices R4 for future expandability. Also, the prefix bytes can be encoded with information on whether a device is a notification device (e.g., sounder device) and/or whether the device needs to respond to the tandem device or tandem NG device capabilities.

| Prefix Byte Values | Decode Rule |
|---|---|
| 1-11 | Decode using existing hard coded rules |
| 12-95 | Decode as 8-bit status |
| 96-175 | Decode as 16-bit status |
| 176-254 | Decode as 32-bit status |

Minimum RSSI Level for Qualifying an RF Network Link

In order to create a reliable RF network, system devices must be physically placed such that RF signals received and sent between devices are at an acceptable/reliable strength such as between master devices (e.g., master repeaters 16) and slave devices 14, 18, 19, 72, 74, 76, 78, 80, 82. Typically, the installation location is based on the geometry of an installation site and the areas that need coverage (e.g., detection, notification, etc.). In order to ensure that a chosen location is the optimal RF location for installation of these devices, an RF Survey is performed to "test" the signal strength at each proposed installation location. When the system 10 is placed in enrollment mode and new slave devices 14, 18, 19, 72, 74, 76, 78, 80, 82 are powered up, the new slave devices 14, 18, 19, 72, 74, 76, 78, 80, 82 look for a master repeater 16 to join, creating new RF links. Slave devices 14, 18, 19, 72, 74, 76, 78, 80, 82 that fall off the RF network automatically attempt to rejoin if the slave devices 14, 18, 19, 72, 74, 76, 78, 80, 82 receive no response from their master repeater 16 and also look to link to another master repeater 16.

Figure 8:
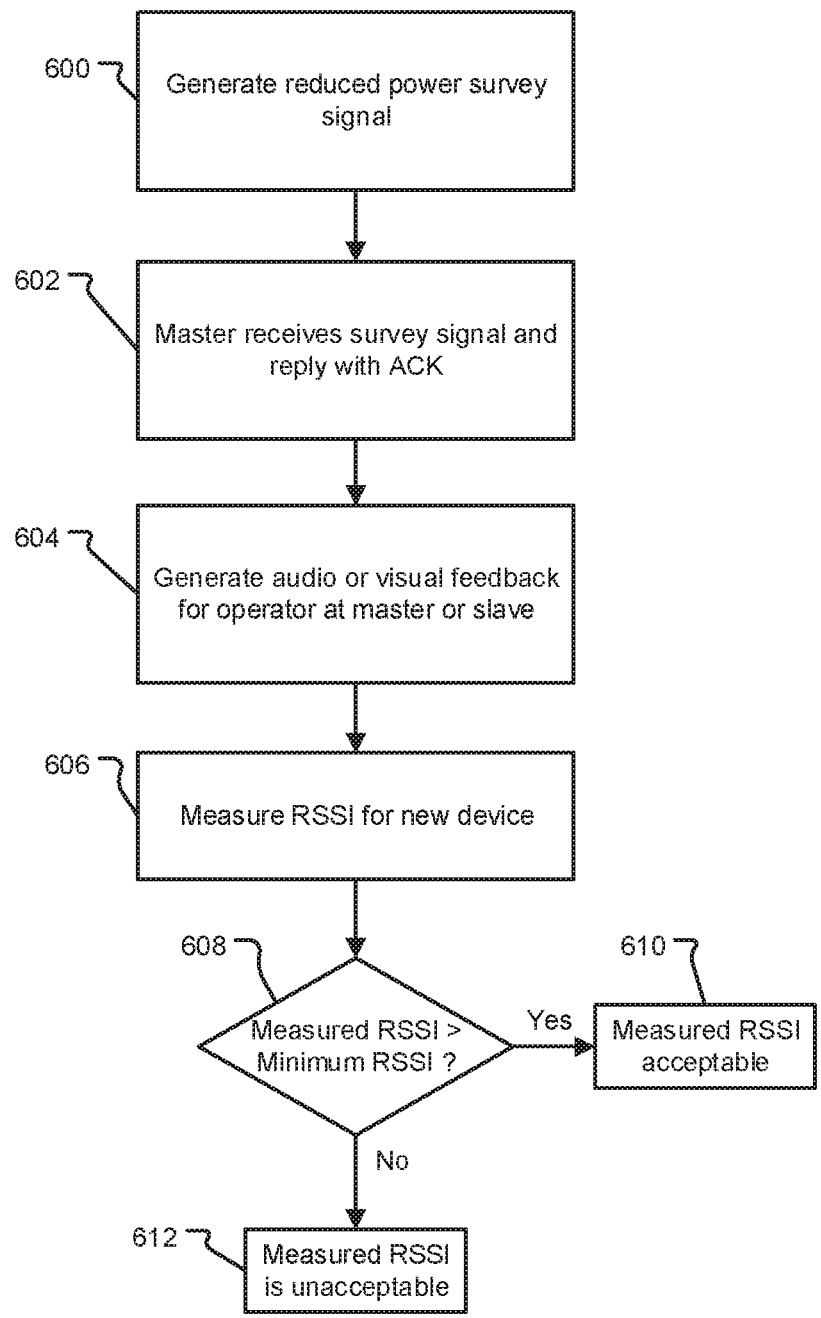
FIG. 8 is a flow chart of a method for qualifying wireless links according to an embodiment of the present invention.

To perform a Survey process, a survey signal is triggered on the slave device 14, 18, 19, 72, 74, 76, 78, 80, 82 in step 600 as illustrated in FIG. 8. In one embodiment, this survey signal is transmitted at reduced power to further enhance the process of creating a "good" RF network link. For example, the survey signal could be half the normal transmitting power to compensate for variations in local conditions and building construction (e.g., walls, floors, metal lath, panels, etc.).

When this survey signal is received by a master repeater 16, the master repeater 16 sends an acknowledgement (ACK) back to the initiating slave device 14, 18, 19, 72, 74, 76, 78, 80, 82 in step 602. Both the send and receive signals are indicated audibly and visually either at the master repeater 16 or at the slave device 14, 18, 19, 72, 74, 76, 78, 80, 82 in step 604. These audible or visual feedback signals indicate to the operator or installer that the survey signal was sent and an ACK response was sent back.

In one embodiment, a digital value is further displayed to indicate the signal strength. The time delay between sending and receiving audible or visual feedback signals (e.g., beeps and or visual flashes) indicates a successful survey transaction, or the failure of the survey if no ACK response with audible/visual feedback is made within the allowed response time. This is both a qualitative method (there is or is not an audible/visual feedback response) and also a subjective decision (e.g., based on the time between beeps or flashes of the audible/visual feedback). However, even with a displayed signal value (e.g., digital ASCII value), bar graph indicator, or an analog needle value, choosing a reliable location can be arbitrarily made by the operator, ignoring system recommendations.

Due to the sensitivity of RF transceivers (e.g., master transceivers 116 or slave transceivers 115), extremely poor RF signals as low as −115 dBm, which is less than 0.008 picoWatts (0.008×10-12 Watts), can be received and properly processed thus giving the impression of an acceptable link. However, this low RF signal strength is considered not reliable and subject to an RF fade margin which can reduce the signal strength below the detectable margin of the RF transceivers.

This survey process is a manual process that attempts to select the optimal location for the best possible RF network link without having to place master repeaters 16 and slave devices 14, 18, 19, 72, 74, 76, 78, 80, 82 too close to each other in order to be cost effective. In the case of new devices being enrolled, the optimal solution is for new devices to join devices that have the best RF signal versus any RF signal—as the new devices could join a device via RF links with low strength and keep falling off and rejoining the network via the weak RF links.

To avoid these potential pitfalls, the present invention provides a method for qualifying that a wireless signal meets a specified minimum acceptable level. A received signal strength indicator (RSSI) is measured at the master device (e.g., master repeater 16) and also preferably at the slave device 14, 18, 19, 72, 74, 76, 78, 80, 82 in step 606. The measured RSSI is compared against a pre-determined minimum RSSI level in step 608. The minimum RSSI level is pre-determined from testing for reliable RF links. Based on this comparison, the link is either determined to be acceptable in step 610 or unacceptable in step 612. Steps 600—612 may be performed by a processor.

Using this minimum RSSI level as a benchmark, any master device (e.g., master repeater 16) receiving a survey or enrollment request (which may still be transmitted at reduced power) can measure a signal and if it does not meet the pre-determined minimum RSSI level, the master device does not send an ACK response. If it does meet the pre-determined minimum RSSI level (i.e., measured RSSI is acceptable), the master device sends an ACK response to the new device that sent the survey or enrollment request. Thus, a user performing a survey can choose a location for installing a device based on whether the signal is acceptable with respect to the minimum RSSI. In one example where a new device has to find a master to join, the new device listens for master beacons to join and measures their signal strength using this process to join only beacons that have qualified RF links meeting the specified minimum RSSI level. In another example, a slave device 14, 18, 19, 72, 74, 76, 78, 80, 82 can optionally send an enrollment Join request to a selected master repeater 16. In this example, the master repeater 16 can measure the signal strength of the RF link with the slave device 14, 18, 19, 72, 74, 76, 78, 80, 82 and determine if the signal strength meets the acceptable level—minimum RSSI level. If the signal strength is below the minimum RSSI, the master repeater 16 does not send an ACK back thus preventing the slave 14, 18, 19, 72, 74, 76, 78, 80, 82 from joining the master repeater 16. The slave 14, 18, 19, 72, 74, 76, 78, 80, 82 can then listen for and choose another qualified master repeater 16 to join. In another example, it is possible to automatically send a predetermined number of survey pulses and then average the RSSI of all these survey pulses to better qualify and smooth out the measured RSSI level. The above described minimum RSSI process can be performed on processors of either master devices such as master repeaters 16 or slave devices 14, 18, 19, 72, 74, 76, 78, 80, 82.

While this invention has been particularly shown and described with references to preferred embodiments thereof, it will be understood by those skilled in the art that various changes in form and details may be made therein without departing from the scope of the invention encompassed by the appended claims.

What is claimed is:

1. A notification system, comprising:
   a control panel that generates wireless radio frequency alarm signals;
   a master notification device for generating an alarm notification in response to the alarm signals from the control panel and generating at least one synchronization signal onto a wired connection; and
   a slave notification device for receiving the synchronization signal via the wired connection and the wireless alarm signals via a slave transceiver and generating an alarm notification in response to receiving both the wireless alarm signals from the control panel via the slave transceiver and the synchronization signal via the wired connection.

2. The system of claim 1, wherein the notification devices validate the wired connection between the devices using the synchronization signal.

3. The system of claim 1, wherein the master notification device generates the synchronization signal based on a synchronization signal received via a wired connection or a wireless link.

4. The system of claim 1, wherein the synchronization signal is used as a drive signal to an alarm notification component.

5. The system of claim 1, wherein the slave notification device is a horn or a strobe.

6. The system of claim 1, wherein the master notification device forms a local synchronized loop with multiple synchronized slave notification devices.

7. The system of claim 1, wherein the slave notification device comprises a sync-input for receiving a wire forming the wired connection and a one or more sync-outputs and the master notification device comprises a sync-output connected to the sync-input of the slave notification device via the wire to thereby form the wired connection.

8. The system of claim 1, wherein the master notification device includes an RF module for receiving the alarm signals from the control panel.

9. The system of claim 8, wherein the master notification device generates the synchronization signal based on a synchronization signal received via a wired connection at a sync-input or a wireless link via the RF module.

10. The system of claim 1, further comprising multiple daisy-chained slave notification devices.

11. A notification method, comprising:
   a control panel generating wireless radio frequency alarm signals;
   one or more master notification devices generating alarm notifications in response to the alarm signals from the control panel and generating synchronization signals on wired connection; and
   slave notification devices receiving the synchronization signals via the wired connections and the wireless alarm signals via slave transceivers and generating alarm notifications in response to receiving both the wireless alarm signals via the slave transceivers from the control panel and the synchronization signals from the master notification devices via the wired connections.

12. The method of claim 11, further comprising the notification devices validating the wired connections between the devices using the synchronization signals.

13. The method of claim 11, further comprising the one or more master notification devices generating the synchronization signals based on a synchronization signal received via a wired connection or a wireless link.

14. The method of claim 11, wherein the slave notification device is a horn or a strobe.

15. The method of claim 11, further comprising the one or more master notification devices forming local synchronized loops, each with multiple synchronized slave notification devices.

16. The method of claim 11, further comprising the one or more master notification devices receiving the alarm signals via wireless links from the control panel.

17. The method of claim 16, further comprising the one or more master notification devices generating the synchronization signals based on synchronization signals received via a wired connection at a sync-input or a wireless link via the RF module.

18. The method of claim 11, further comprising multiple daisy-chained slave notification devices.

19. The system of claim 1, wherein the master notification device further generates a heartbeat signal onto the wired connection to verify that the wire connection between the master notification device and the slave notification device is not broken, wherein if the slave notification device does not receive the heartbeat signal for a predetermined time period, then the slave notification device reports trouble to the control panel.

20. The system of claim 19, wherein if the master notification device receives a heartbeat signal from another notification device, the master notification device sends a fault to the control panel reporting that two devices or more have been configured as master notification devices.

21. The method of claim 11, further comprising the master notification devices generating heartbeat signals onto the wired connections to verify that the wire connections between the master notification devices and the slave notification devices are not broken, wherein if the slave notification devices do not receive the heartbeat signals for a predetermined time period, then the slave notification devices report trouble to the control panel.

22. The method of claim 21, wherein if the master notification devices receive heartbeat signals from another notification devices, the master notification devices send a fault to the control panel reporting that two devices or more have been configured as master notification devices.

* * * * *